US010735220B2

(12) United States Patent
Cook

(10) Patent No.: US 10,735,220 B2
(45) Date of Patent: Aug. 4, 2020

(54) SHARED DEVICES WITH PRIVATE AND PUBLIC INSTANCES

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Broomfield, CA (US)

( * ) Notice: Subject to any disclaimer, the term of this patent is extended or adjusted under 35 U.S.C. 154(b) by 624 days.

(21) Appl. No.: 15/389,732

(22) Filed: Dec. 23, 2016

(65) Prior Publication Data

US 2018/0183685 A1 Jun. 28, 2018

(51) Int. Cl.
*G06F 15/173* (2006.01)
*H04L 12/46* (2006.01)
(Continued)

(52) U.S. Cl.
CPC .......... *H04L 12/4641* (2013.01); *H04L 67/12* (2013.01); *H04L 67/20* (2013.01);
(Continued)

(58) Field of Classification Search
CPC ..... H04L 67/12; H04L 12/4641; H04L 67/20; H04L 41/22; H04L 41/0813; H04W 4/70;
(Continued)

(56) References Cited

U.S. PATENT DOCUMENTS 5,717,955 A 2/1998 Swinehart
6,125,291 A 9/2000 Miesel
(Continued)

FOREIGN PATENT DOCUMENTS

CN 101799987 B 11/2011
KR 2015-0128346 A 11/2015
(Continued)

OTHER PUBLICATIONS

International Search Report and Written Opinion prepared by the Korean Intellectual Property Office as International Searching Authority for PCT International Patent Application No. PCT/US2017/034531 dated Aug. 29, 17; 18 pages.
(Continued)

*Primary Examiner* — Oleg Survillo

(57) ABSTRACT

Novel tools and techniques are provided for implementing Internet of Things ("IoT") functionality. In some embodiments, a processor might receive sensor data from a plurality of sensors of a first IoT-capable device, and might analyze the sensor data to determine whether to send the sensor data to at least one of second IoT-capable devices or user devices, each associated with the user of the first IoT-capable device, and/or to at least one of third IoT-capable devices associated with one or more third party groups. Based on a determination to send the sensor data to at least one of the second IoT-capable devices associated with the user, the user devices associated with the user, and/or the third IoT-capable devices associated with third party group(s), the processor might send the sensor data to the at least one of the second IoT-capable devices, the user devices, and/or the third IoT-capable devices.

34 Claims, 13 Drawing Sheets

(51) Int. Cl.
   *H04L 29/08* (2006.01)
   *H04W 4/38* (2018.01)
   *H04W 4/70* (2018.01)
   *H04W 4/08* (2009.01)
   *H04L 12/24* (2006.01)

(52) U.S. Cl.
   CPC .............. *H04W 4/08* (2013.01); *H04W 4/38* (2018.02); *H04W 4/70* (2018.02); *H04L 41/0813* (2013.01); *H04L 41/22* (2013.01)

(58) Field of Classification Search
   CPC ......... H04W 4/80; H04W 4/38; H04W 84/18; H04W 4/08
   See application file for complete search history.

(56) References Cited

U.S. PATENT DOCUMENTS

| | | |
|---|---|---|
| 6,388,399 B1 | 5/2002 | Eckel |
| 6,792,319 B1 | 9/2004 | Bilger |
| 7,030,781 B2 | 4/2006 | Jones |
| 7,096,003 B2 | 8/2006 | Joao |
| 7,397,363 B2 | 7/2008 | Joao |
| 7,739,030 B2 | 6/2010 | Desai |
| 8,296,383 B2 | 10/2012 | Lindahl |
| 8,380,652 B1 | 2/2013 | Francis, Jr. |
| 8,654,936 B1 | 2/2014 | Eslambolchi et al. |
| 9,009,230 B1 * | 4/2015 | Matthieu ................ H04L 69/08 709/204 |
| 9,298,410 B2 | 3/2016 | Juchem |
| 9,432,340 B1 | 8/2016 | Tutt et al. |
| 9,456,276 B1 | 9/2016 | Chhetri |
| 9,460,618 B1 | 10/2016 | Soltesz |
| 9,536,425 B1 | 1/2017 | Soltesz |
| 9,646,480 B2 | 5/2017 | Fadell |
| 9,669,872 B2 | 6/2017 | Rebhan |
| 9,672,734 B1 | 6/2017 | Ratnasingam |
| 9,761,136 B2 | 9/2017 | Tonguz |
| 9,860,677 B1 | 1/2018 | Agerstam |
| 9,905,122 B2 | 2/2018 | Sloo |
| 9,917,903 B2 | 3/2018 | Clernon |
| 10,069,751 B2 | 9/2018 | Amulothu |
| 10,253,468 B1 | 4/2019 | Linville |
| 10,281,166 B1 * | 5/2019 | Hutz ................ F24F 11/30 |
| 2001/0029311 A1 | 10/2001 | Khare |
| 2002/0024450 A1 | 2/2002 | Townsend |
| 2003/0061029 A1 | 3/2003 | Shaket |
| 2004/0083054 A1 | 4/2004 | Jones |
| 2004/0091313 A1 | 5/2004 | Zhou |
| 2004/0113773 A1 | 6/2004 | Nieters |
| 2004/0142658 A1 | 7/2004 | McKenna |
| 2004/0160319 A1 | 8/2004 | Joao |
| 2005/0248444 A1 | 11/2005 | Joao |
| 2006/0150644 A1 | 7/2006 | Wruck |
| 2006/0219382 A1 | 10/2006 | Johnson |
| 2007/0048084 A1 | 3/2007 | Jung |
| 2007/0079113 A1 | 4/2007 | Kulkarni et al. |
| 2008/0197204 A1 | 8/2008 | Whitney |
| 2008/0216367 A1 | 9/2008 | Van der Poel |
| 2008/0234878 A1 | 9/2008 | Joao |
| 2008/0256008 A1 | 10/2008 | Kwok |
| 2008/0300776 A1 | 12/2008 | Petrisor |
| 2008/0303654 A1 | 12/2008 | Kates |
| 2009/0121860 A1 | 5/2009 | Kimmel |
| 2009/0125160 A1 | 5/2009 | Desai |
| 2009/0134993 A1 | 5/2009 | Ashworth |
| 2009/0327910 A1 | 12/2009 | Black |
| 2010/0045484 A1 | 2/2010 | Brynielsson |
| 2010/0124332 A1 | 5/2010 | Arena |
| 2010/0217604 A1 | 8/2010 | Baldwin et al. |
| 2010/0325421 A1 | 12/2010 | Park et al. |
| 2011/0106321 A1 | 5/2011 | Cherian |
| 2011/0161076 A1 | 6/2011 | Davis |
| 2011/0288684 A1 | 11/2011 | Farlow |
| 2012/0086563 A1 | 4/2012 | Arling |
| 2012/0249341 A1 | 10/2012 | Brown |
| 2012/0265370 A1 | 10/2012 | Kim |
| 2013/0009569 A1 | 1/2013 | Knibbe |
| 2013/0038461 A1 | 2/2013 | Hawkes |
| 2013/0074067 A1 | 3/2013 | Chowdhry |
| 2013/0138424 A1 | 5/2013 | Koenig |
| 2013/0217421 A1 | 8/2013 | Kim |
| 2013/0238326 A1 | 9/2013 | Kim et al. |
| 2013/0297199 A1 | 11/2013 | Kapp |
| 2014/0018969 A1 | 1/2014 | Forbes |
| 2014/0033288 A1 | 1/2014 | Wynn |
| 2014/0146905 A1 | 5/2014 | Zavadsky |
| 2014/0167931 A1 | 6/2014 | Lee et al. |
| 2014/0180478 A1 | 6/2014 | Letsky |
| 2014/0188463 A1 | 7/2014 | Noh et al. |
| 2014/0257693 A1 | 9/2014 | Ehlers |
| 2014/0275852 A1 | 9/2014 | Hong |
| 2014/0343950 A1 | 11/2014 | Simpson et al. |
| 2015/0097686 A1 | 4/2015 | Fadell |
| 2015/0100167 A1 | 4/2015 | Sloo |
| 2015/0187200 A1 | 7/2015 | Fadell |
| 2015/0249672 A1 | 9/2015 | Burns et al. |
| 2015/0262102 A1 | 9/2015 | Tann |
| 2015/0298654 A1 | 10/2015 | Joao |
| 2015/0350247 A1 | 12/2015 | Adler et al. |
| 2015/0365278 A1 | 12/2015 | Chakrabarti et al. |
| 2016/0021127 A1 | 1/2016 | Yan |
| 2016/0029346 A1 | 1/2016 | Suresh et al. |
| 2016/0063857 A1 | 3/2016 | Fowe |
| 2016/0064829 A1 | 3/2016 | Schaepperle |
| 2016/0080322 A1 | 3/2016 | Prisser |
| 2016/0085594 A1 | 3/2016 | Wang |
| 2016/0088464 A1 * | 3/2016 | Hans ................ H04M 3/42229 455/558 |
| 2016/0093213 A1 | 3/2016 | Rider |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226674 A1 | 8/2016 | Kangshang et al. |
| 2016/0248746 A1 | 8/2016 | James |
| 2016/0267790 A1 | 9/2016 | Raamot |
| 2016/0277310 A1 | 9/2016 | Challa |
| 2016/0278599 A1 | 9/2016 | Seo |
| 2016/0294828 A1 | 10/2016 | Zakaria |
| 2016/0295364 A1 | 10/2016 | Zakaria |
| 2016/0323271 A1 | 11/2016 | Hinman |
| 2016/0329040 A1 | 11/2016 | Whinnery |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0024535 A1 * | 1/2017 | Matz ................ G06F 19/3418 |
| 2017/0026157 A1 | 1/2017 | Bugenhagen et al. |
| 2017/0026472 A1 | 1/2017 | Bugenhagen et al. |
| 2017/0060369 A1 | 3/2017 | Goyal |
| 2017/0064491 A1 * | 3/2017 | Mirza ................ H04W 4/70 |
| 2017/0083005 A1 | 3/2017 | Hickman |
| 2017/0093866 A1 | 3/2017 | Ben-Noon |
| 2017/0110784 A1 | 4/2017 | Vermes et al. |
| 2017/0134937 A1 | 5/2017 | Miller |
| 2017/0141575 A1 | 5/2017 | Fulton |
| 2017/0171747 A1 | 6/2017 | Britt et al. |
| 2017/0176034 A1 | 6/2017 | Hussain |
| 2017/0181383 A1 | 6/2017 | Shen |
| 2017/0187807 A1 | 6/2017 | Clernon |
| 2017/0192437 A1 | 7/2017 | Bier |
| 2017/0195318 A1 | 7/2017 | Liu |
| 2017/0201504 A1 | 7/2017 | Funk |
| 2017/0206900 A1 | 7/2017 | Lee et al. |
| 2017/0229004 A1 | 8/2017 | Shah |
| 2017/0237815 A1 | 8/2017 | Arsenault |
| 2017/0253258 A1 | 9/2017 | Bramucci |
| 2017/0274898 A1 | 9/2017 | Nakamura |
| 2017/0279620 A1 | 9/2017 | Kravitz et al. |
| 2017/0300953 A1 | 10/2017 | Kim |
| 2017/0345295 A1 | 11/2017 | Mattar |
| 2017/0345420 A1 | 11/2017 | Barnett, Jr. |

(56) References Cited

U.S. PATENT DOCUMENTS

| | | |
|---|---|---|
| 2017/0358025 A1 | 12/2017 | Varma |
| 2017/0371337 A1 | 12/2017 | Ramasamy |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0113450 A1 | 4/2018 | Sherony |
| 2018/0122506 A1 | 5/2018 | Grantcharov |
| 2018/0132227 A1 | 5/2018 | Ghosh |
| 2018/0168464 A1 | 6/2018 | Barnett, Jr. et al. |
| 2018/0174449 A1 | 6/2018 | Nguyen |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183874 A1 | 6/2018 | Cook |
| 2018/0188704 A1 | 7/2018 | Cella |
| 2018/0299290 A1 | 10/2018 | Slavin |
| 2018/0370567 A1 | 12/2018 | Rowell |
| 2018/0374347 A1 | 12/2018 | Silver |
| 2019/0028134 A1 | 1/2019 | Barnett, Jr. |
| 2019/0035269 A1 | 1/2019 | Donovan |
| 2019/0049994 A1 | 2/2019 | Pohl |
| 2019/0073899 A1 | 3/2019 | Radomy |
| 2019/0106099 A1 | 4/2019 | Funk et al. |
| 2019/0213100 A1* | 7/2019 | Tayeb ................. G06F 11/3058 |

FOREIGN PATENT DOCUMENTS

| | | |
|---|---|---|
| WO | WO-2009-098676 | 8/2009 |
| WO | WO-2013-058648 | 4/2013 |
| WO | WO-2017-123392 A1 | 7/2017 |

OTHER PUBLICATIONS

International Preliminary Report on Patentability, PCT International Application No. PCT/US17-034531 dated Nov. 27, 2018, 15 pages.
International Preliminary Report on Patentability, dated Jul. 26, 2018, 8 pages.
Alexander, Chris, et al., "Improved User Authentication in Off-The-Record Messaging", Pub. 2009, 7 pages.
Bersch, Christian, et al., "Bimanual Robotic Cloth Manipulation for Laundry Folding", Pub. 2011, 7 pages.
Borisov, Nikita, et al., "Off-the-Record Communication, or, Why Not to Use PGP", Pub. 2004, 8 pages.
De Raimondo, Mario, et al., "Secure Off the Record Messaging", Pub. 2005; 9 pages.
Goldberg, Ian, et al., "Multi-Party Off the Record Messaging", Pub. 2007, 11 pages.
International Search Report and Written Opinion prepared by the Korean Intellectual Property Office as International Searching Authority for PCT Intl Patent App. No. PCT/US2016/067938 dated Mar. 31, 2017; 11 pages.
Stedman, Ryan, et al., "A User Study of Off-the-Record Messaging", *Symposium on Usable Privacy and Security*, Jul. 23-25, 2008, 10 pages.

* cited by examiner

SHARED DEVICES WITH PRIVATE AND PUBLIC INSTANCES

CROSS-REFERENCES TO RELATED APPLICATIONS

This application may be related to each of U.S. patent application Ser. No. 14/946,540 (the "'540 application"), filed on Nov. 19, 2015 by Michael K. Bugenhagen et al. and titled, "Customer Based Internet of Things (IOT)", which claims priority to U.S. Patent Application Ser. No. 62/196,086 (the "'086 application"), filed Jul. 23, 2015 by Michael K. Bugenhagen et al. and titled, "Customer Based Internet of Things (IOT)"; U.S. patent application Ser. No. 14/946,548 (the "'548 application"), filed on Nov. 19, 2015 by Michael K. Bugenhagen et al. and titled, "Customer Based Internet of Things (IOT)—Transparent Privacy Functionality", which claims priority to U.S. Patent Application Ser. No. 62/196,090 (the "'090 application"), filed Jul. 23, 2015 by Michael K. Bugenhagen and titled, "Customer Based Internet of Things (IOT)—Transparent Privacy Functionality"; and U.S. patent application Ser. No. 15/084,805 (the "'805 application"), filed on Mar. 30, 2016 by Tom Funk and titled, "System and Method for Implementing Secure Communications for Internet of Things (IOT) Devices", which claims priority to U.S. Patent Application Ser. No. 62/277,245 (the "'245 application"), filed Jan. 11, 2016 by Tom Funk and titled, "IoT Security through Combining TOR Messenger with MQTT or Additional Protocols". This application may be related to U.S. patent application Ser. No. 15/370,764 (the "'764 application"), filed Dec. 6, 2016 by Thomas C. Barnett, Jr. and titled, "Internet of Things (IoT) Human Interface Apparatus, System, and Method", which claims priority to U.S. Patent Application Ser. No. 62/342,710 (the "'710 application"), filed May 27, 2016 by Thomas C. Barnett, Jr. and titled, "Internet of Things (IoT) Human Interface Apparatus, System, and Method". This application may be related to U.S. patent application Ser. No. 15/385,667 (the "'667 application"), filed Dec. 20, 2016 by Thomas C. Barnett, Jr. et al. and titled, "Internet of Things (IoT) Personal Tracking Apparatus, System, and Method". This application may also be related to U.S. Patent Application Ser. No. 62/397,086 (the "'7086 application"), filed Sep. 20, 2016 by Thomas Schwengler et al. and titled, "Universal Wireless Station for Multiple Simultaneous Wireless Services" and U.S. Patent Application Ser. No. 62/403,878 (the "'878 application"), filed Oct. 4, 2016 by Thomas Schwengler et al. and titled, "Universal Wireless Station for Multiple Simultaneous Wireless Services".

This application may also be related to each of U.S. patent application Ser. No. 14/678,208 (the "'208 application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; and U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV)".

This application may be related to each of U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237,981, filed Oct. 6, 2015 by Michael K. Bugenhagen and titled, "NFV Peripheral Network Driver for VNF's".

This application may also be related to each of U.S. patent application Ser. No. 15/148,688 (the "'688 application"), filed on May 6, 2016 by Charles I. Cook et al. and titled, "System and Method for Implementing Network Enhanced Gateway Functionality"; U.S. patent application Ser. No. 15/148,705 (the "'705 application"), filed on May 6, 2016 by Charles I. Cook et al. and titled, "System and Method for Implementing Extension of Customer LAN at Provider Network Service Point"; U.S. patent application Ser. No. 15/148,711 (the "'711 application"), filed May 6, 2016 by Charles I. Cook et al. and titled, "System and Method for Implementing Isolated Service Overlays between Provider Network Service Point and Customer Premises"; U.S. patent application Ser. No. 15/148,721 (the "'721 application"), filed on May 6, 2016 by Charles I. Cook et al. and titled, "System and Method for Implementing Network Experience Shifting"; and U.S. patent application Ser. No. 15/222,623 (the "'623 application"), filed Jul. 28, 2016 by Michael K. Bugenhagen et al. and titled, "System and Method for Implementing Customer Control Point or Customer Portal". Each of the '688, '705, '711, and '721 applications claim priority to each of U.S. Patent Application Ser. No. 62/157,795 (the "'795 application"), filed May 6, 2015 by Charles I. Cook et al. and titled, "NFVI Enhanced Open Business/Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172,359 (the "'359 application"), filed Jun. 8, 2015 by Charles I. Cook et al. and titled, "Enhanced LAN With Customer Portal Control". The '721 application further claims priority to U.S. Patent Application Ser. No. 62/299,346 (the "'346 application"), filed Feb. 24, 2016 by Charles I. Cook et al. and titled, "Experience Shifting". The '623 application claims priority to the '346 application and to U.S. Patent Application Ser. No. 62/299,357 (the "'357 application"), filed Feb. 24, 2016 by Michael K. Bugenhagen et al. and titled, "Control Point or Customer Portal".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things functionality, and, in particular embodiments, to methods, systems, apparatus, and computer software for implementing Internet of Things ("IoT") functionality for shared devices with public and private instances.

BACKGROUND

Although Internet of Things ("IoT") devices can currently be found in the market place, such convention IoT devices do not appear to provide sharing access and data (e.g., sensor data or the like) with third party communities or servers, while providing private data access and control to the owner of the devices.

Hence, there is a need for more robust and scalable solutions for implementing Internet of Things functionality, and, in particular embodiments, to methods, systems, apparatus, and computer software for implementing Internet of Things ("IoT") functionality for shared devices with public and private instances.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
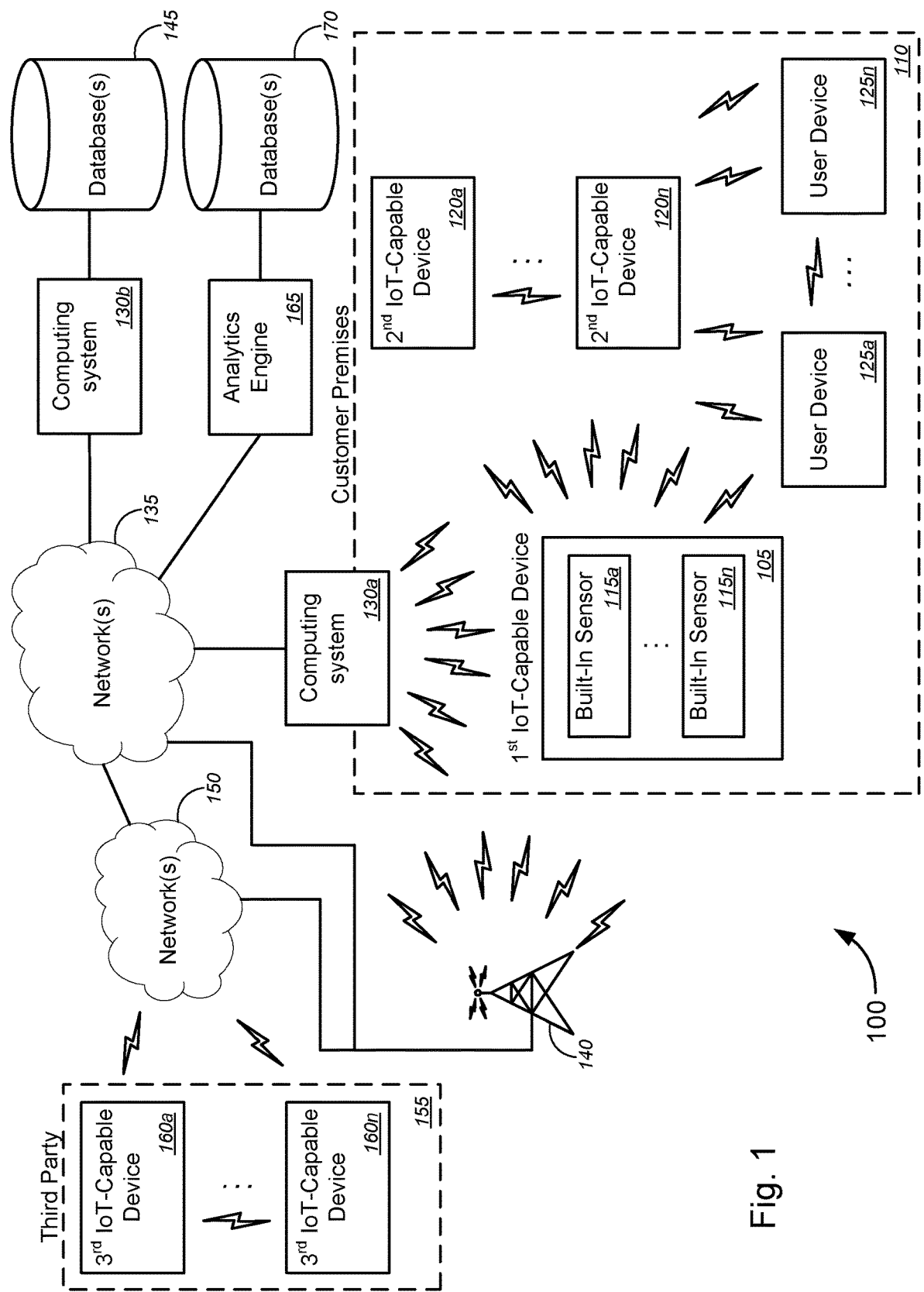
FIG. 1 is a schematic diagram illustrating a system for implementing Internet of Things ("IoT") functionality for shared devices with public and private instances, in accordance with various embodiments.

Various embodiments provide tools and techniques for implementing Internet of Things functionality, and, in particular embodiments, to methods, systems, apparatus, and computer software for implementing Internet of Things ("IoT") functionality for shared devices with public and private instances.

In various embodiments, a first IoT-capable device or an external processor (e.g., a processor of a customer premises gateway device, a processor of a network gateway device, a processor of an IoT gateway device, or a processor of an IoT human interface device, and/or the like) might receive at least one sensor data from each of a plurality of sensors of the first IoT-capable device, and might analyze the at least one sensor data to determine whether to send the sensor data to at least one of second IoT-capable devices or user devices, each associated with the user of the first IoT-capable device, and/or to at least one of third IoT-capable devices associated with one or more third party groups. Based on a determination to send the sensor data to at least one of the second IoT-capable devices associated with the user, the user devices associated with the user, and/or the third IoT-capable devices associated with third party group(s), the first IoT-capable device or the external processor might send the sensor data to the at least one of the second IoT-capable devices, the user devices, and/or the third IoT-capable devices. In some cases, the sensor data might be autonomously sent to the at least one of the second IoT-capable devices, the user devices, and/or the third IoT-capable devices. Alternatively, the sensor data might be sent to the at least one of the second IoT-capable devices, the user devices, and/or the third IoT-capable devices in response to a polling command from the at least one of the second IoT-capable devices, the user devices, and/or the third IoT-capable devices.

Merely by way of example, in some cases, the plurality of sensors might include, without limitation, at least one of a temperature sensor (e.g., heat sensors, infrared sensors, thermometers, ambient temperature sensors, skin temperature sensors, etc.), a particulate sensor, a light sensor (e.g., ambient light sensors, luminosity sensors, illuminance sensors, solar light sensors, etc.), an air quality sensor (e.g., CO sensors, toxic gas sensors, pollution sensors, etc.), a humidity sensor, a proximity sensor (e.g., for sensing proximity to user devices, to IoT-devices, to emergency response devices, to safe zone transponders, to other locations, etc.), a location sensor (e.g., global positioning system ("GPS") devices, global navigation satellite system ("GNSS") devices, relative position sensors, other location sensors, etc.), a location beacon (that broadcasts or otherwise transmits location information of the object within which the beacon is disposed), an object identifier beacon (that broadcasts or otherwise transmits object identification or identifier information to requesting devices or the like), a flame detector, an atmospheric oxygen level monitor, an atmospheric carbon dioxide level monitor, an atmospheric nitrogen level monitor, an atmospheric pressure sensor, a smoke detector, a toxicity monitor (e.g., skin toxicity monitors, gas toxicity monitors, liquid toxicity monitors, poison detectors, carcinogen detectors, etc.), a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor, and/or the like.

In some cases, the first IoT-capable device or the external processor might analyze the at least one sensor data to determine whether to send the at least one sensor data to at least one of second IoT-capable devices associated with the user or user devices associated with the user based at least in part on a determination as to whether the at least one sensor data satisfies one or more first conditions, the one or more first conditions comprising at least one of exceeding a first predetermined threshold value for a sensor-type of the one or more first sensors or falling within a first monitoring interval, and/or the like. Likewise, the first IoT-capable device or the external processor might analyze the at least one sensor data to determine whether to send the at least one sensor data to at least one of third devices associated with third party groups based at least in part on a determination as to whether the at least one sensor data satisfies one or more second conditions, the one or more second conditions comprising at least one of exceeding a first predetermined threshold value for a sensor-type of the one or more first sensors or falling within a first monitoring interval, and/or the like. In some cases, at least one of the one or more second conditions is different from at least one of the one or more first conditions, while, in other cases, each of the one or more second conditions is different from each of the one or more first conditions.

According to some embodiments, the at least one first sensor data may be sent (either autonomously, in response to a polling command from the destination device, or in response to a command instruction by the external processor) to the at least one of the one or more second IoT-capable devices associated with the user or the one or more user devices associated with the user via one or more first application programming interfaces ("APIs") established between the first IoT-capable device and each of the at least one of the one or more second IoT-capable devices associated with the user or the one or more user devices associated with the user. Alternatively, or additionally, the at least one first sensor data may be sent (either autonomously, in response to a polling command from the destination device, or in response to a command instruction by the external processor) to the at least one of the one or more second IoT-capable devices associated with the user or the one or more user devices associated with the user via one or more first virtual private network ("VPN") connections established between the first IoT-capable device and each of the at least one of the one or more second IoT-capable devices associated with the user or the one or more user devices associated with the user.

In a similar manner, the at least one first sensor data may be sent (either autonomously, in response to a polling command from the destination device, or in response to a command instruction by the external processor) to the at least one third device of the one or more third devices associated with each of the one or more third party groups via one or more second APIs established between the first IoT-capable device and each of the at least one third device of the one or more third devices associated with each of the one or more third party groups. Alternatively, or additionally, the at least one first sensor data may be sent (either autonomously, in response to a polling command from the destination device, or in response to a command instruction by the external processor) to the at least one third device of the one or more third devices associated with each of the one or more third party groups via one or more second VPN connections established between the first IoT-capable device and each of the at least one third device of the one or more third devices associated with each of the one or more third party groups.

The user can register or de-register one or more shared IoT devices (or IoT-capable devices) with the servers or networks of one or more third party groups or communities, in some cases, via portals (e.g., web portals or the like) or apps (e.g., service provider apps or apps associated with the third party servers or networks, or the like). The user can also select what level of access should be granted to the third party servers or networks. Such level of access might include instituting access restrictions, which might include, but are not limited to, one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like. In some cases, the user might post availability of resources of the shared IoT devices on a publically accessible portal, which, in some instances, might track subscribers to the each of the shared IoT devices, and might provide the user with information regarding the subscribers to each of the shared IoT devices. In some instances, the portal might manage subscriber registration and access to the shared IoT-capable device.

In some embodiments, the user might interact with the IoT-capable device via one or more of the following interface functionalities (depending upon what each particular tracking device possesses in terms of hardware, software, virtual functionalities, etc.): voice interface functionality; touch interface functionality; haptic feedback interface functionality; wireless communication interface functionality; gesture interface functionality; and/or the like.

According to some embodiments, a plurality of other APIs may communicate with thousands of devices. In some cases, the IoT-capable device might communicate with a remote computing system that handles, coordinates, and/or manages IoT communications and interactions amongst a plurality of IoT devices (and in some instances, all IoT devices) that are communicatively coupled to the service provider network that is associated with the remote computing system and/or to any network with which the remote computing system is in communication. In some embodiments, quantum security methods may be utilized to protect data and user privacy.

In some embodiments, simple artificial intelligence ("AI") or full AI integration may be utilized within the IoT-capable device to aid in interactions with humans, machine-to-machine interactions, and/or other functionalities. In some instances, a set of thresholds in sensor levels of the IoT-capable device and/or of one or more other IoT devices to which the IoT-capable device is communicatively coupled may be utilized to initiate action (including, but not limited to, alerts, interpretation triggers, specific network actions, specific software/hardware actions, etc.). According to some embodiments, IPv4 identifiers, IPv6 identifiers, or other unique identifiers (including, but not limited to, at least one of Internet Protocol ("IP")-based, location based, or media access control identification ("MAC ID")-based identifiers, and/or the like) may be used for each IoT device (including the IoT-capable devices, the user devices, etc.), in some cases together with other identifiers for the same device (in some cases, identification capability can simplify device registration and/or can be used for machine-to-machine communications, machine-to-network communications, etc.). In some cases, energy harvesting may be utilized to power IoT devices (including the IoT-capable devices), either in populated areas or in remote areas. In some embodiments, the IoT-capable device (and/or other IoT devices communicatively coupled thereto) may be configured and/or designed to be agnostic to hardware or network of devices with which it is in communication.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, machine-to-machine communication, shared data device technologies, user monitoring technologies, environmental monitoring technologies, and/or the like. In other aspects, certain embodiments, can improve the functioning of user equipment or systems themselves (e.g., IoT device networks, IoT devices, IoT systems, human interface devices, user monitoring devices, environmental monitoring systems, etc.), for example, by analyzing sensor data from either built-in IoT sensors of an IoT-capable device and/or external IoT sensors, to determine whether or not to send the sensor data to at least one of other IoT-capable devices associated with the user of the IoT-capable device, user devices associated with the user, and/or IoT-capable devices associated with third party groups or communities, and, based on a determination to send the sensor data to particular one or ones of these devices, sending via machine-to-machine communications the sensor data to the particular one or ones of these devices, and/or the like. In particular, to the extent any abstract concepts are present in the various embodiments, those concepts can be implemented as described herein by devices, software, systems, and methods that involve specific novel functionality (e.g., steps or operations), such as analyzing the sensor data from the built-in and/or external IoT sensors, to determine whether or not to send the sensor data to at least one of other IoT-capable devices associated with the user of the IoT-capable device, user devices associated with the user, and/or IoT-capable devices associated with third party groups or communities, and, based on a determination to send the sensor data to particular one or ones of these devices, sending via machine-to-machine communications the sensor data to the particular one or ones of these devices, and/or the like, which improves the interaction between the various IoT devices within the user's network (and perhaps also across various networks associated with both the user and third party groups or communities), improves the functionality of the IoT community networks and servers by providing data from shared IoT devices, improves the functionality of the network of IoT devices, and/or the like, to name a few examples, that extend beyond mere conventional computer processing operations. These functionalities can produce tangible results outside of the implementing computer system, including, merely by way of example, improved functionality of IoT community networks and servers, improved functionality of the network of IoT devices, and/or the like, at least some of which may be observed or measured by customers and/or service providers.

In an aspect, a method might comprise receiving, with a processor, at least one first sensor data from each of one or more first sensors of a first Internet of Things ("IoT")-capable device associated with a user. The method might also comprise analyzing, with the processor, the at least one first sensor data to determine whether to send the at least one first sensor data to at least one of second IoT-capable devices associated with the user or user devices associated with the user and, based on a determination to send the at least one first sensor data to at least one of one or more second IoT-capable devices associated with the user or one or more user devices associated with the user, sending, via machine-to-machine communication, the at least one first sensor data to the at least one of the one or more second IoT-capable devices associated with the user or the one or more user devices associated with the user. The method might further comprise analyzing, with the processor, the at least one first sensor data to determine whether to send the at least one first sensor data to at least one of third devices associated with third party groups with which the user has shared at least some access to the first IoT-capable device and, based on a determination to send the at least one first sensor data to at least one of one or more third devices associated with each of the one or more third party groups, sending, via machine-to-machine communication, the at least one first sensor data to the at least one third device of the one or more third devices associated with each of the one or more third party groups.

In some embodiments, the one or more first sensors might comprise at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor, and/or the like.

In some cases, the processor is one of a processor of a customer premises gateway device, a processor of a network gateway device, a processor of an IoT gateway device, or a processor of an IoT human interface device, and sending the at least one first sensor data might comprise autonomously sending, by the processor of the one of the processor of the customer premises gateway device, the processor of the network gateway device, the processor of the IoT gateway device, or the processor of the IoT human interface device and via machine-to-machine communication, the at least one first sensor data to one or more of the at least one third device of the one or more third devices associated with each of the one or more third party groups or the at least one of the one or more second IoT-capable devices associated with the user or the one or more user devices associated with the user, via a corresponding one of the customer premises gateway device, the network gateway device, the IoT gateway device, or the IoT human interface device, and/or the like.

According to some embodiments, wherein the processor is one of a processor of the first IoT-capable device, a processor of a customer premises gateway device, a processor of a network gateway device, a processor of an IoT gateway device, or a processor of an IoT human interface device, analyzing the at least one first sensor data to determine whether to send the at least one first sensor data to at least one of second IoT-capable devices associated with the user or user devices associated with the user might comprise analyzing, with the processor, the at least one first sensor data to determine whether to send the at least one first sensor data to at least one of second IoT-capable devices associated with the user or user devices associated with the user based at least in part on a determination as to whether the at least one first sensor data satisfies one or more first conditions, the one or more first conditions comprising at least one of exceeding a first predetermined threshold value for a sensor-type of the one or more first sensors or falling within a first monitoring interval. Alternatively or additionally, analyzing the at least one first sensor data to determine whether to send the at least one first sensor data to at least one of third devices associated with third party groups might comprise analyzing, with the processor, the at least one first sensor data to determine whether to send the at least one first sensor data to at least one of third devices associated with third party groups based at least in part on a determination as to whether the at least one first sensor data satisfies one or more second conditions, the one or more second conditions comprising at least one of exceeding a second predetermined threshold value for a sensor-type of the one or more first sensors or falling within a second monitoring interval, where at least one of the one or more second conditions is different from at least one of the one or more first conditions.

In some embodiments, the processor might be one of a processor of a customer premises gateway device, a processor of a network gateway device, a processor of an IoT gateway device, or a processor of an IoT human interface device, and/or the like. Sending the at least one first sensor data to the at least one of the one or more second IoT-capable devices associated with the user or the one or more user devices associated with the user might comprise sending, by the first IoT-capable device, the at least one first sensor data to the at least one of the one or more second IoT-capable devices associated with the user or the one or more user devices associated with the user, in response to command instructions from the one of the processor of the customer premises gateway device, the processor of the network gateway device, the processor of the IoT gateway device, or the processor of the IoT human interface device to send the at least one first sensor data to the at least one of the one or more second IoT-capable devices or the one or more user devices. Similarly, sending the at least one first sensor data to the at least one third device of the one or more third devices associated with each of the one or more third party groups might comprise sending, by the first IoT-capable device, the at least one first sensor data to the at least one third device of the one or more third devices associated with each of the one or more third party groups, in response to command instructions from the one of the processor of the customer premises gateway device, the processor of the network gateway device, the processor of the IoT gateway device, or the processor of the IoT human interface device to send the at least one first sensor data to the at least one third device.

In some cases, sending the at least one first sensor data to the at least one of the one or more second IoT-capable devices associated with the user or the one or more user devices associated with the user might comprise autonomously sending, by the first IoT-capable device, the at least one first sensor data to the at least one of the one or more second IoT-capable devices associated with the user or the one or more user devices associated with the user. Likewise, sending the at least one first sensor data to the at least one third device of the one or more third devices associated with each of the one or more third party groups might comprise autonomously sending, by the first IoT-capable device, the at least one first sensor data to the at least one third device of the one or more third devices associated with each of the one or more third party groups.

According to some embodiments, sending the at least one first sensor data to the at least one of the one or more second IoT-capable devices associated with the user or the one or more user devices associated with the user, based on determination to send the at least one first sensor data to at least one of one or more second IoT-capable devices associated with the user or one or more user devices associated with the user, might comprise sending, by the first IoT-capable device, the at least one first sensor data to the at least one of the one or more second IoT-capable devices associated with the user or the one or more user devices associated with the user, in response to a sensor polling request from the at least one of the one or more second IoT-capable devices associated with the user or the one or more user devices associated with the user. In a similar manner, sending the at least one first sensor data to the at least one third device of the one or more third devices associated with each of the one or more third party groups, based on a determination to send the at least one first sensor data to at least one of one or more third devices associated with each of the one or more third party groups, might comprise sending, by the first IoT-capable device, the at least one first sensor data to the at least one third device of the one or more third devices associated with each of the one or more third party groups, in response to a sensor polling request from the at least one third device of the one or more third devices associated with each of the one or more third party groups.

In some instances, sending the at least one first sensor data to the at least one of the one or more second IoT-capable devices associated with the user or the one or more user devices associated with the user might comprise sending the at least one first sensor data to the at least one of the one or more second IoT-capable devices associated with the user or the one or more user devices associated with the user via one or more first application programming interfaces ("APIs") established between the first IoT-capable device and each of the at least one of the one or more second IoT-capable devices associated with the user or the one or more user devices associated with the user. Alternatively or additionally, sending the at least one first sensor data to the at least one of the one or more second IoT-capable devices associated with the user or the one or more user devices associated with the user might comprise sending the at least one first sensor data to the at least one of the one or more second IoT-capable devices associated with the user or the one or more user devices associated with the user via one or more first virtual private network ("VPN") connections established between the first IoT-capable device and each of the at least one of the one or more second IoT-capable devices associated with the user or the one or more user devices associated with the user.

In a similar manner, sending the at least one first sensor data to the at least one third device of the one or more third devices associated with each of the one or more third party groups might comprise sending the at least one first sensor data to the at least one third device of the one or more third devices associated with each of the one or more third party groups via one or more second APIs established between the first IoT-capable device and each of the at least one third device of the one or more third devices associated with each of the one or more third party groups. Alternatively or additionally, sending the at least one first sensor data to the at least one third device of the one or more third devices associated with each of the one or more third party groups might comprise sending the at least one first sensor data to the at least one third device of the one or more third devices associated with each of the one or more third party groups via one or more second VPN connections established between the first IoT-capable device and each of the at least one third device of the one or more third devices associated with each of the one or more third party groups.

In some embodiments, access to sensor data from each of one or more first sensors of the first IoT-capable device by one or more of the at least one of the one or more second IoT-capable devices associated with the user or the one or more user devices associated with the user or the at least one third device of the one or more third devices associated with each of the one or more third party groups might be defined by the user using a portal. In some cases, the portal might comprise one of a web portal associated with a service provider, a web portal associated with the first IoT-capable device, a web portal associated with at least one of the one or more third party groups, a software application ("app") user interface ("UI") associated with a service provider, a software app UI associated with the first IoT-capable device, or a software app UI associated with at least one of the one or more third party groups through which the user registers the IoT-capable device for access by the one or more of the at least one third device of the one or more third devices associated with each of the one or more third party groups or the at least one of the one or more second IoT-capable devices associated with the user or the one or more user devices associated with the user, and/or the like.

In some instances, configuration of the first IoT-capable device might be changed to accommodate configuration of an accessing device during access of the at least one first sensor data by the accessing device, the accessing device being one of the one or more second IoT-capable devices associated with the user, the one or more user devices associated with the user, or the at least one third device of the one or more third devices associated with each of the one or more third party groups, and/or the like. In some cases, the accessing device might change the configuration of the first IoT-capable device to accommodate its configuration, during access of the at least one first sensor data, and might restore the configuration of the first IoT-capable device, after access of the at least one first sensor data. Alternatively, after access of the at least one first sensor data by the accessing device, which changes the configuration of the first IoT-capable device to accommodate its configuration, the first IoT-capable device might restore its (own) current configuration to its configuration prior to access by the accessing device, either after a predetermined interval after the accessing device has stopped access or in response to a restoration instruction from the accessing device.

According to some embodiments, analyzing the at least one first sensor data to determine whether to send the at least one first sensor data to at least one of third devices associated with third party groups with which the user has shared at least some access to the first IoT-capable device might comprise analyzing, with the processor, the at least one first sensor data to determine whether to send the at least one first sensor data to at least one of third devices associated with third party groups with which the user has shared at least some access to the first IoT-capable device based on access restrictions placed by the user on each of the third party groups associated with the at least one third device. The access restrictions might comprise one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like. In such embodiments, sending the at least one first sensor data to the at least one third device of the one or more third devices associated with each of the one or more third party groups might comprise sending, via machine-to-machine communication, the at least one first sensor data to the at least one third device of the one or more third devices associated with each of the one or more third party groups, by giving the at least one third device one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like, consistent with the access restrictions placed by the user on each of the third party groups associated with the at least one third device In some embodiments, availability of resources of the first IoT-capable device might be posted on a publically accessible portal. The portal, in some cases, might track subscribers to the first IoT-capable device and might provide the user with information regarding the subscribers to the first IoT-capable device. In some instances, the portal might manage subscriber registration and access to the first IoT-capable device. Merely by way of example, in some instances, the first IoT-capable device might be one of a plurality of IoT-capable devices, and each IoT-capable device might be assigned a unique identifier. The unique identifier might be at least one of Internet Protocol ("IP")-based, location based, or media access control identification ("MAC ID")-based, and/or the like. In some cases, the unique identifier might be one of a unique IPv4 identifier or a unique IPv6 identifier, or the like.

In another aspect, a shared Internet of Things ("IoT")-capable device might comprise at least one processor, one or more first sensors, at least one transceiver, and a non-transitory computer readable medium communicatively coupled to the at least one processor. The non-transitory computer readable medium might have stored thereon computer software comprising a set of instructions that, when executed by the at least one processor, causes the shared IoT-capable device to: receive at least one first sensor data from each of the one or more first sensors; analyze the at least one first sensor data to determine whether to send the at least one first sensor data to at least one of second IoT-capable devices associated with a user or user devices associated with the user; based on a determination to send the at least one first sensor data to at least one of one or more second IoT-capable devices associated with the user or one or more user devices associated with the user, sending, via machine-to-machine communication using the at least one transceiver, the at least one first sensor data to the at least one of the one or more second IoT-capable devices associated with the user or the one or more user devices associated with the user; analyze the at least one first sensor data to determine whether to send the at least one first sensor data to at least one of third devices associated with third party groups with which the user has shared at least some access to the first IoT-capable device; and based on a determination to send the at least one first sensor data to at least one of one or more third devices associated with each of the one or more third party groups, send, via machine-to-machine communication using the at least one transceiver, the at least one first sensor data to the at least one third device of the one or more third devices associated with each of the one or more third party groups.

According to some embodiments, the one or more first sensors might comprise at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor, and/or the like. In some cases, the shared IoT-capable device might comprise at least one of one or more wireless access points, one or more sensor devices, one or more cameras, a gateway device, or an IoT human interface device, and/or the like.

In some instances, sending the at least one first sensor data might comprise sending, via machine-to-machine communication, the at least one first sensor data to one or more of the at least one third device of the one or more third devices associated with each of the one or more third party groups or the at least one of the one or more second IoT-capable devices associated with the user or the one or more user devices associated with the user, via at least one of a customer premises gateway device, a network gateway device, an IoT gateway device, or an IoT human interface device, and/or the like.

In some embodiments, configuration of the first IoT-capable device might be changed to accommodate configuration of an accessing device during access of the at least one first sensor data by the accessing device, the accessing device being one of the one or more second IoT-capable devices associated with the user, the one or more user devices associated with the user, or the at least one third device of the one or more third devices associated with each of the one or more third party groups, and/or the like. In some cases, the accessing device might change the configuration of the first IoT-capable device to accommodate its configuration, during access of the at least one first sensor data, and might restore the configuration of the first IoT-capable device, after access of the at least one first sensor data. Alternatively, after access of the at least one first sensor data by the accessing device, which changes the configuration of the first IoT-capable device to accommodate its configuration, the first IoT-capable device might restore its (own) current configuration to its configuration prior to access by the accessing device, either after a predetermined interval after the accessing device has stopped access or in response to a restoration instruction from the accessing device.

Merely by way of example, in some instances, analyzing the at least one first sensor data to determine whether to send the at least one first sensor data to at least one of third devices associated with third party groups with which the user has shared at least some access to the first IoT-capable device might comprise analyzing the at least one first sensor data to determine whether to send the at least one first sensor data to at least one of third devices associated with third party groups with which the user has shared at least some access to the first IoT-capable device based on access restrictions placed by the user on each of the third party groups associated with the at least one third device. The access restrictions might comprise one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like. In some embodiments, sending the at least one first sensor data to the at least one third device of the one or more third devices associated with each of the one or more third party groups might comprise sending, via machine-to-machine communication, the at least one first sensor data to the at least one third device of the one or more third devices associated with each of the one or more third party groups, by giving the at least one third device one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like, consistent with the access restrictions placed by the user on each of the third party groups associated with the at least one third device.

According to some embodiments, the first IoT-capable device might be one of a plurality of IoT-capable devices, and each IoT-capable device might be assigned a unique identifier. The unique identifier might be at least one of Internet Protocol ("IP")-based, location based, or media access control identification ("MAC ID")-based, and/or the like.

In yet another aspect, a system might comprise a first IoT-capable device and a computing system. The first IoT-capable device might comprise at least one first processor, one or more first sensors, at least one first transceiver, and a first non-transitory computer readable medium communicatively coupled to the at least one first processor. The first non-transitory computer readable medium might have stored thereon computer software comprising a first set of instructions that, when executed by the at least one first processor, causes the first IoT-capable device to: receive at least one first sensor data from each of the one or more first sensors; and send the at least one first sensor data to the computing system via the at least one first transceiver.

The computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the computing system to: receive the at least one first sensor data from each of one or more first sensors of the first IoT-capable device; analyze the at least one first sensor data to determine whether to send the at least one first sensor data to at least one of second IoT-capable devices associated with a user or user devices associated with the user; based on a determination to send the at least one first sensor data to at least one of one or more second IoT-capable devices associated with the user or one or more user devices associated with the user, sending, via machine-to-machine communication using the at least one transceiver, the at least one first sensor data to the at least one of the one or more second IoT-capable devices associated with the user or the one or more user devices associated with the user; analyze the at least one first sensor data to determine whether to send the at least one first sensor data to at least one of third devices associated with third party groups with which the user has shared at least some access to the first IoT-capable device; and based on a determination to send the at least one first sensor data to at least one of one or more third devices associated with each of the one or more third party groups, send, via machine-to-machine communication using the at least one transceiver, the at least one first sensor data to the at least one third device of the one or more third devices associated with each of the one or more third party groups.

In some embodiments, the computing system might comprise one of one or more processors disposed within one of the one or more second IoT-capable devices associated with the user, one or more processors disposed within one of the one or more user devices associated with the user, one or more processors disposed within one of the at least one third device of the one or more third devices associated with each of the one or more third party groups, a customer premises gateway device, a network gateway device, an IoT gateway device, or an IoT human interface device, and/or the like.

In some cases, the computing system might be disposed within the first IoT-capable device, and sending the at least one first sensor data to a computing system via the at least one first transceiver and receiving the at least one first sensor data from each of one or more first sensors of the first IoT-capable device might comprise sending and receiving the at least one first sensor data between the one or more first sensors and the computing system via an internal communications system of the first IoT-capable device.

Merely by way of example, in some instances, the one or more first sensors might comprise at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor, and/or the like.

According to some embodiments, the first IoT-capable device might be one of a plurality of IoT-capable devices, and each IoT-capable device might be assigned a unique identifier. The unique identifier might be at least one of Internet Protocol ("IP")-based, location based, or media access control identification ("MAC ID")-based, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing Internet of Things functionality, and, in particular embodiments, to methods, systems, apparatus, and computer software for implementing Internet of Things ("IoT") functionality for shared devices with public and private instances, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing Internet of Things ("IoT") functionality for shared devices with public and private instances, in accordance with various embodiments. In the non-limiting embodiment of FIG. 1, system 100 might include, without limitation, a first IoT-capable device 105, which in some embodiments might be located at a customer premises 110 or might otherwise be associated with a user (yet may not be restricted to being located at the customer premises 110). The customer premises 110 might, in some instances, include, without limitation, a residential premises, a business premises, a multi-dwelling premises, a unit within a multi-dwelling premises, industrial premises, commercial offices, government facility, public facility, and/or the like. In some embodiments, the first IoT-capable device 105 might comprise one or more Built-In IoT-capable sensors 115a-115n (collectively, "Built-In IoT-capable sensors 115," "IoT-capable sensors 115," "IoT sensors 115," or "sensors 115"). Although not shown, the first IoT-capable device 105 might alternatively, or additionally, comprise one or more external IoT-capable sensors that feed sensor data (via wired or wireless connection) to the first IoT-capable device 105. System 100 might, according to some embodiments, further comprise at least one of one or more second IoT-capable devices 120a-120n (collectively, "second IoT-capable devices 120," "IoT devices 120," or "devices 120"), one or more user devices 125a-125n (collectively, "user devices 125" or "devices 125"), and/or the like, each of which might be either located at the customer premises 110 or associated with the user but not necessarily restricted to being located at the customer premises 110. Here, the first IoT-capable device 105 might be similar, if not identical, to each of the second IoT-capable devices 120a-120n, except that, for the purposes of illustration herein, the first IoT-capable device 105 refers to the device whose sensors are the focus of access configurations, settings, or sharing with respect to other devices, while the one or more second IoT-capable devices 120 refer to the one or more of a plurality of the devices that seek access rights to the sensors of the first IoT-capable device 105. When the sensors of each of the one or more second IoT-capable devices 120 become the focus of access configurations, settings, or sharing with respect to other devices, the particular second IoT-capable devices 120 will be referred to as the first IoT-capable device 105.

Merely by way of example, in some aspects, each of the first and second IoT-capable devices 105 and 120 might include, without limitation, at least one of one or more wireless access points ("WAPs"), one or more sensor devices, one or more cameras, a gateway device, or an IoT human interface device (such as the IoT human interface device as described in detail in the '764 and '710 applications, which have already been incorporated herein by reference in their entirety), and/or the like that are associated with the user. The one or more user devices 125, in some instances, might include, but are not limited to, at least one of a tablet computer, a smart phone, a mobile phone, a personal digital assistant, a desktop computer, a television, a set-top box, a gaming console, a portable gaming device, a human interface device (such as the IoT human interface device as described in detail in the '764 and '710 applications), and/or the like that are associated with the user and that are in wireless communication with the first IoT-capable devices 105, with at least one of the one or more second IoT-capable devices 120, and/or with at least one of the one or more user devices 125.

The one or more sensors 115 might include, without limitation, at least one of a temperature sensor (e.g., heat sensors, infrared sensors, thermometers, ambient temperature sensors, skin temperature sensors, etc.), a particulate sensor, a light sensor (e.g., ambient light sensors, luminosity sensors, illuminance sensors, solar light sensors, etc.), an air quality sensor (e.g., CO sensors, toxic gas sensors, pollution sensors, etc.), a humidity sensor, a proximity sensor (e.g., for sensing proximity to user devices, to IoT-devices, to emergency response devices, to safe zone transponders, to other locations, etc.), a location sensor (e.g., global positioning system ("GPS") devices, global navigation satellite system ("GNSS") devices, relative position sensors, other location sensors, etc.), a location beacon (that broadcasts or otherwise transmits location information of the object within which the beacon is disposed), an object identifier beacon (that broadcasts or otherwise transmits object identification or identifier information to requesting devices or the like), a flame detector, an atmospheric oxygen level monitor, an atmospheric carbon dioxide level monitor, an atmospheric nitrogen level monitor, an atmospheric pressure sensor, a smoke detector, a toxicity monitor (e.g., skin toxicity monitors, gas toxicity monitors, liquid toxicity monitors, poison detectors, carcinogen detectors, etc.), a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor, and/or the like.

In some embodiments, the system 100 might comprise a computing system 130a, which might be located at the customer premises 110 or might serve as a demarcation point between the customer local area network at the customer premises 110 and the service provider network (e.g., network(s) 135 or the like). The computing system 130a might communicatively couple (via wired or wireless connection) with the first IoT-capable device 105 (and perhaps also with each of at least one of the one or more second IoT-capable devices 120 and/or with each of at least one of the one or more user devices 125). Alternatively, or additionally, system 100 might comprise a remote computing system 130b that is associated with a service provider and that provides similar (if not identical) functionality as the computing system 130a. The remote computing system 130b might communicatively couple (via wired or wireless connection) with the first IoT-capable device 105 (and perhaps also with each of at least one of the one or more second IoT-capable devices 120 and/or with each of at least one of the one or more user devices 125), via network(s) 135, in some cases, via one or more telecommunications relay systems 140 and/or via computing system 130a. In some cases, the remote computing system 130b might communicatively couple with one or more databases 145 that store at least one of information regarding the first IoT-capable device 105; information regarding at least one of the one or more sensors 115; information regarding at least one of the one or more second IoT-capable devices 120; information regarding at least one of the one or more user devices 125; information regarding communications amongst these devices and sensors; information regarding data exchanged between the user and each of the devices 105, 120, and/or 125; information regarding the network; information regarding communications between the computing system 130a or 130b and each of the first IoT-capable device 105, the second IoT-capable devices 120, and the user devices 125; and/or the like. Any sensitive information, such as health-related information, sensor data related to physiological conditions of the user, personal information about the user, or other sensitive data might be encrypted prior to any communications with other devices, and in some cases may be encrypted prior to storing on the local data stores of the devices, and/or may not be sent at all. In some embodiments, quantum security methods may be utilized to protect data and user privacy. In some embodiments, the remote computing system may be comprised of purpose-build hardware, may be instantiated as virtual service (such as a Virtual Network Function ("VNF")) on generic hardware, or may be instantiated in a cloud network, and/or the like.

According to some embodiments, the network(s) 135 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 135 might include an access network of the service provider (e.g., an Internet service provider ("ISP")), or the like. The one or more telecommunications relay systems 140 might include, without limitation, one or more wireless network interfaces (e.g., wireless modems, wireless access points, and the like), one or more towers, one or more satellites, and/or the like. According to some embodiments, one or more of the first IoT-capable devices 105, at least one of the one or more second IoT-capable devices 120, and/or at least one of the one or more user devices 125 might each comprise a software-defined multiple radio device or other multiple radio device (e.g., multiple radio devices that comprise multiple physical layer chipsets or the like) that allows each of these devices to simultaneously operate in several standards and frequencies, including, but not limited to, Wi-Fi, LTE, IoT standards (like 6LowPAN, LoRa, etc.). In this manner, these devices might each serve as an access point, small cell, and IoT base, simultaneously, with the same RF transmit stage. The multiple radio device functionality and implementation are described in detail in the '7086 and '878 applications, which have already been incorporated herein by reference in their entirety.

Merely by way of example, in some embodiments, system 100 might further comprise network 150 that might be associated with a third party 155. System 100 might further comprise one or more third IoT-capable devices 160a-160n (collectively, "third IoT-capable devices 160," "IoT devices 160," or "devices 160"). Like the first and second IoT-capable devices 105 and 120, the one or more third IoT-capable devices 160, which might be located at a location associated with the third party 155 or might otherwise be located external to the customer premises 110, might include, but are not limited to, at least one of one or more WAPs, one or more sensor devices, one or more cameras, a gateway device, or an IoT human interface device (such as the IoT human interface device as described in detail in the '764 and '710 applications), and/or the like that are not associated with the user. The one or more IoT-capable devices 160 might communicatively couple (via wired or wireless connection) with the first IoT-capable device 105 (and perhaps also with each of at least one of the one or more second IoT-capable devices 120 and/or with each of at least one of the one or more user devices 125), via network(s) 135 and, in some cases, via at least one of network(s) 150, the one or more telecommunications relay systems 140, and/or computing system 130a.

In some cases, the system 100 might further comprise an analytics engine 165 and an associated database(s) 170 that together analyze and track (or record) non-sensitive communications amongst the various components of system 100 (i.e., the first IoT-capable device 105, the one or more second IoT-capable devices 120, the one or more user devices 125, the computing systems 130a and/or 130b, the one or more third IoT-capable devices 160, and/or the like) to identify trends as well as to identify potential issues with communications or efficiency of the system, and/or the like, the results of which might cause the computing system 130a and/or 130b to send software updates to affected or applicable ones of the first IoT-capable device 105, the one or more second IoT-capable devices 120, the one or more user devices 125, the one or more third IoT-capable devices 160, and/or the like. In some embodiments, the database 170 might also contain profiles regarding how each of the first IoT-capable device 105, the one or more second IoT-capable devices 120, the one or more user devices 125, the one or more third IoT-capable devices 160, and/or the like is to respond under certain conditions communicated to the analytics engine 165 from the IoT sensors 115, the IoT devices 105, 120, and/or 160, the user devices 125, and/or the like.

The machine-to-machine communications between the first IoT-capable device 105 and each of the one or more second IoT-capable devices 120a-120n, between the first IoT-capable device 105 and each of the one or more user devices 125a-125n are represented in FIG. 1 by the lightning bolt symbols, which in some cases denotes wireless communications (although, in some instances, need not be wireless, but can be wired communications). In some instances, each IoT-capable device of the plurality of IoT-capable devices 105, 120a-120n, and 160a-160n, each IoT-capable sensor of the plurality of IoT-capable sensors 115a-115n, each user device 125a-125n, and/or the like might be assigned a unique identifier that enables secure and non-confused communications with particular IoT-capable devices or sensors (as no two devices or sensors will have the same identifier). In some cases, the unique identifier is at least one of Internet Protocol ("IP")-based, location based, or media access control identification ("MAC ID")-based, and/or the like. In some instances, the unique identifier might include one of an IPv4 identifier or an IPv6 identifier, or the like. In some cases, the IPv4 or IPv6 identifiers may be used together with other identifiers for the same device. In some instances, such identification capability can simplify device registration and/or can be used to facilitate machine-to-machine communications, machine-to-network communications, and/or the like. In some embodiments, the IoT-capable device may have multiple profiles or identities to allow it to be reached by third party IoT networks. The identities may be switched by time, location, or some other stimulus. Alternatively, the IoT-capable device may support multiple identifiers simultaneously.

According to some embodiments, one or more application programming interfaces ("APIs") might be established between the first IoT-capable device 105 and each of the IoT-capable sensors 115a-115n, between the first IoT-capable device 105 and each of the one or more second IoT-capable devices 120a-120n, between the first IoT-capable device 105 and each of the one or more user devices 125a-125n, between the first IoT-capable device 105 and each of the computing systems 130a or 130b, between the first IoT-capable device 105 and each of the one or more third IoT-capable devices 160a-160n, between the first IoT-capable device 105 and the analytics engine 165, and/or the like. The APIs facilitate communications with these IoT-capable devices, which could number in the thousands or more. In some embodiments, artificial intelligence ("AI") may be utilized in the IoT-capable devices to improve machine-to-machine interactions between the first IoT-capable device 105 and each of the IoT-capable sensors 115a-115n, between the first IoT-capable device 105 and each of the one or more second IoT-capable devices 120a-120n, between the first IoT-capable device 105 and each of the one or more user devices 125a-125n, between the first IoT-capable device 105 and each of the computing systems 130a or 130b, between the first IoT-capable device 105 and each of the one or more third IoT-capable devices 160a-160n, between the first IoT-capable device 105 and the analytics engine 165, and/or the like, and to improve utilization of the IoT-capable sensors 115, the plurality of IoT-capable devices 105, 125, and/or 160, and the plurality of user devices 125, and/or the like.

In some embodiments, the first IoT-capable device 105 might include, without limitation, at least one of a voice interface device (including one or more speakers and one or more microphones; in some cases with voice and language recognition; perhaps assisted by any AI functionality that is present in the device or the like), a button interface, a gesture control interface, a location beacon (that sends location information to other devices, in some cases, in a broadcast, in a unicast, or in a directed transmission manner, or the like), a touchscreen user interface, a display interface, a haptic feedback interface, a wireless communications interface (that can communicate with one or more user devices associated with the user), and/or the like. In other words through one or more of voice interactions, physical interactions, gesture interactions, and/or user device interactions, or the like, the user can communicate with and interact with at least one of the IoT-capable devices 105 and/or 120 to provide information to the IoT-capable devices 105 and/or 120, to provide information to the computing systems 130a and/or 130b, to provide commands to at least one of the IoT-capable devices 105 and/or 120, to receive sensor data or analyses of sensor data, to receive alerts, to receive feedback or suggestions, and/or the like.

In operation, the first IoT-capable device 105 might receive at least one sensor data from each of at least one sensor of the one or more IoT-capable sensors 115a-115n. The first IoT-capable device 105 and/or the computing system 130a and/or 130b might analyze the at least one sensor data to determine whether to send the at least one sensor data to at least one of second IoT-capable devices 120a-120n that are associated with the user or user devices 125a-125n that are associated with the user. Based on a determination to send the at least one sensor data to at least one of one or more second IoT-capable devices 120a-120n that are associated with the user or one or more user devices 125a-125n that are associated with the user, the first IoT-capable device 105 and/or the computing system 130a and/or 130b might send, via machine-to-machine communication, the at least one sensor data to the at least one of the one or more second IoT-capable devices 120a-120n that are associated with the user or one or more user devices 125a-125n that are associated with the user. In some cases, the first IoT-capable device 105 and/or the computing system 130a and/or 130b might analyze the at least one sensor data to determine whether to send the at least one sensor data to at least one of third devices 160a-160n associated with third party groups with which the user has shared at least some access to the first IoT-capable device 105. Based on a determination to send the at least one sensor data to at least one of one or more third devices associated with each of the one or more third party groups, the first IoT-capable device 105 and/or the computing system 130a and/or 130b might send, via machine-to-machine communication, the at least one sensor data to the at least one third device 160 of the one or more third devices 160a-160n associated with each of the one or more third party groups. The machine-to-machine communications between the first IoT-capable device 105 and each of the user devices 125a-125n or each of the second IoT-capable devices 120a-120n are represented in FIG. 1 by the lightning bolt symbols, which in some cases denotes wireless communications (although, in some instances, need not be wireless, but can be wired communications). Machine-to-machine communications is also shown by the solid lines (e.g., the solid lines connecting the first IoT-capable device 105 with network(s) 135 (and the third devices 160a-160n via network(s) 150)).

Merely by way of example, in some embodiments, a single IoT-capable device 105 might be associated with a specific function and a specific network. However, in some cases it would be beneficial for an IoT device to be associated with more than one network. For example, an individual may have an IoT device that monitors the environmental quality of the air around his or her home (e.g., by utilizing an air quality sensor or the like). The results of this sensor may indicate whether it is an ozone alert day that may impact people with respiratory concerns. At the same time, this same device could be providing atmospheric data to a larger community to track the progression and size of an area under an ozone alert. Further, there may be research activities that could also benefit from the data. So, in this case, there are three different communities that can leverage the capabilities of a particular IoT sensor. Consequently, it would be beneficial for such a sensor to be registered to participate in all three communities.

The owner of the device may find it beneficial to participate in multiple communities, but obviously has the option to only register the device with his or her own personal IoT network. However, external communities may provide benefit or incentive to encourage the owner to register his or her IoT device on their networks as well. Also, the external communities may have different thresholds, monitoring intervals, etc. that would result in the IoT device behaving uniquely for that particular community.

In some embodiments, the IoT device might have a unique identifier to enable communities to know what the device is, its capabilities, its location, etc. The unique identifier could be IP-based, location-based, or MAC-ID-based, etc., or a combination of these types of identifiers. In some cases, it may be necessary for the IoT device to participate in a virtual private network ("VPN") belonging to each community for increased security when participating in that community. Other mechanisms may also be used to include the device in a particular community.

According to some embodiments, a community may establish a portal such as a web portal that the owner of the IoT device may use to register his or her IoT device to participate in that particular community. Alternatively, or additionally, there may be an electronic market place where the owner may list/post the availability of their IoT sensor and appropriate instructions to allow a third-party IoT network to discover the IoT device, determine whether or not to add it to the third party network, and if the decision is to add it, the prescribed registration procedure can be initiated. Registration information would include, but is not limited to, a unique device identifier, an address or mechanism to communicate with the IoT, the owner of the device, the capabilities of the device, the resource availability of the device, and priorities associated with the device to define behavior in the event of congestion (e.g., multiple communities polling the device at the same time.), and/or the like. The owner of shared IoT devices can, at any time, unregister their device from a community. In a sense, the physical IoT device may be considered a virtual IoT device when it is used by an external community because it is not actually a physical asset that the external community owns. However, from the perspective of each such IoT device, such devices are shared IoT devices.

Some devices may be capable of being reconfigured by each community during the time they have access to the IoT device resources. Some devices may support multiple profiles such that a profile can be created for each community that it participates in. Some devices may only be able to broadcast sensor data. Some devices may not be able to support configuration data and profiles local to itself, and may rely on the owner's IoT gateway device to act as a proxy. Additionally, such a proxy IoT gateway could exist in the service provider network either on dedicated hardware or as a virtual machine.

The IoT device may, in some instances, perform in a broadcast only mode in which it would broadcast its data to a set of addresses associated with the communities it participates in. Alternatively, it may rely on the IoT gateway (belonging to the owner, located in a service provider network, or virtualized, and the like) to forward the IoT data to the communities that the IoT device is registered with. Potentially, IoT gateways can be nested to provide access to additional communities and to provide additional control.

In the case where the IoT device can be configurable by an external IoT community server either directly or through an IoT gateway proxy, it may be appropriate to multi-cast configurations to multiple IoT devices simultaneously or concurrently. Some IoT community servers may elect to always send IoT configuration prior to polling a shared IoT device (for sensor or other data) to ensure a known state and configuration. After receiving the polled data, the IoT device may reset itself to the owner's configuration. Alternatively, the community server may first learn the current configuration of the IoT device, update the configuration, poll the data, and then restore the configuration to the state that it was in before. Again, this could be done directly or through a gateway proxy.

Some configurations, particularly in IoT devices with minimal configurability, the device may not be able to be polled. The community server may instead be in a listen-only mode relative to the IoT device. Alternatively, the configuration server may be able to negotiate or specify a time when the IoT device provides senor data to the community. According to some embodiments, sensor data may be polled by a third party computing or analytics engine (in such cases, the analytics engine 165 might be associated with the third party). When polling, the computing system (e.g., computing system 130) must be able to address a uniquely identified IoT device at a time when the device is registered (e.g., by using the unique identifiers described above) in order to provide data to the third party computing system/analytics engine for processing.

Merely by way of example, according to some embodiments, the community may create a virtualized copy of the shared IoT device that it can interact with in order to simulate various scenarios such as configuration behavior, prior to actually requesting reception of data from the physical IoT device. This enables the IoT community to assess how IoT devices in the community might interact and assess the accuracy and value of the community's network.

In some embodiments, ownership of the IoT device may be tiered, meaning that a community, in order to get people to place these devices on their property, may provide certain incentives which may include a discount on the physical device, an agreement that a portion of the device resources will always be available to the community at a given priority level, and/or the like. Alternatively, the owner of the physical IoT device may be able to lease certain resources to an IoT community or to set up a billing system to charge communities accessing the IoT device based on data type, time, number of polls/queries, amount of data, etc., thus creating an economic incentive for the owner of the physical IoT device to register the IoT device with a community.

The owner of the physical IoT device may offer the resources of the device to anyone that is interested. The owner can post the availability to a publically available site/portal (such as the electronic market place mentioned above) for anyone to get access to. The portal can, in some instances, track who subscribes to the IoT device, and might provide that information to the owner of the physical IoT device. In some instances, the portal might also manage subscriber registration and access to the IoT device.

According to some embodiments, the IoT device may have multiple registers or storage elements that may store previous sensor data. For example, if the sensor is designed to sample temperature at 15 minute intervals, the device may store a sliding window of the previous 10 samples. The sensor could be configured to transmit all samples in its sample window, or it could be configured to provide some or all information upon request from a server or external processor that is designed to collect data from sensors for processing.

In some cases, the IoT devices may communicate with peer IoT devices, or they may communicate with IoT gateways or to IoT application servers through gateways. IoT sensors and/or devices may communicate either in the same way or differently depending on what other device it is communicating with. A sensor may communicate current status information to a peer device for the peer device to forward. At the same time, the sensor may communicate a history of data samples to a gateway or server that is capable of processing or managing larger amounts of data.

In some embodiments, other mechanisms may be used to create third-party networks. For example, the IoT device may have a personality that allows it to cycle multiple IPv4, IPv6, or other addressing mechanisms to enable multiple third party networks to reach the IoT device. If the addressing happens to be time-sensitive, the IoT device and the third party networks can be synchronized so that the third-party IoT network knows when to address a given shared IoT device. The IoT device and/or the third party network may also provide timing information to enable re-synchronization should synchronization be lost. In some instances, other mechanisms to communicate data may also be incorporated. For example, the communications may be scheduled, or the data may be pulled or polled from the IoT device.

At least some of these and other functions of the system 100 (and its components) are described in greater detail below with respect to FIGS. 2-4.

Figure 2:
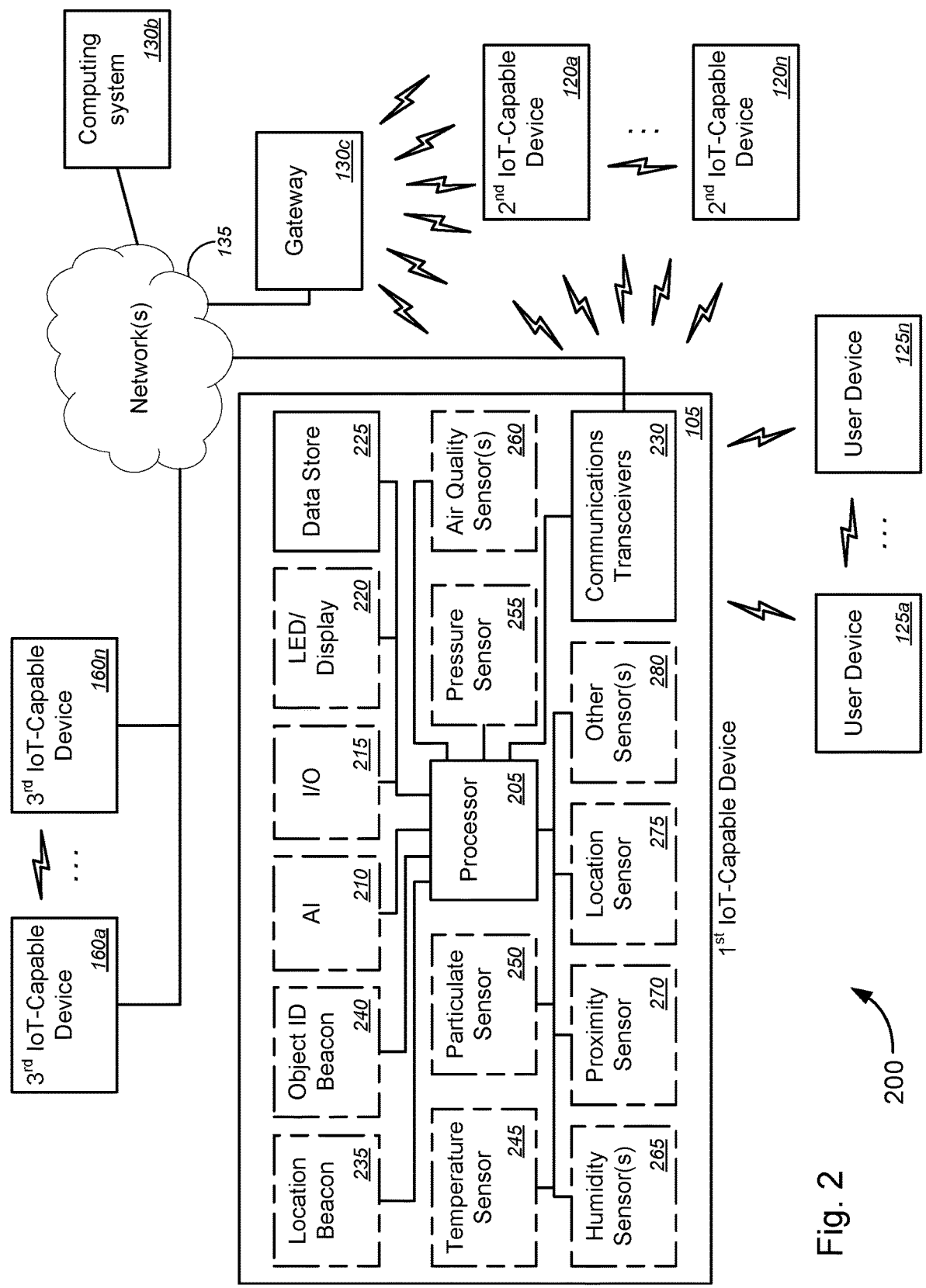
FIG. 2 is a schematic diagram illustrating another system for implementing IoT functionality for shared devices with public and private instances, in accordance with various embodiments.

FIG. 2 is a schematic diagram illustrating another system 200 for implementing IoT functionality for shared devices with public and private instances, in accordance with various embodiments.

With reference to the non-limiting embodiment of FIG. 2, according to some embodiments, system 200 might comprise a first IoT-capable device 105 (which in this case is a wearable device, a household device, an office device, a stationary device, or a portable device, and/or the like) that might include, without limitation, one or more processors 205 (which in some cases might include an artificial intelligence ("AI") system or module 210 (optional)), an input/output ("I/O") device 215 (optional), one or more LED/display devices 220 (optional), one or more data stores or computer readable storage media 225, one or more communications transceivers 230, a location beacon 235 (that broadcasts or otherwise transmits location information of the object within which the beacon is disposed) (optional), an object identifier beacon 240 (that broadcasts or otherwise transmits object identification or identifier information to requesting devices or the like) (optional), one or more temperature sensors 245 (e.g., heat sensors, infrared sensors, thermometers, ambient temperature sensors, skin temperature sensors, etc.) (optional), one or more particulate sensors 250 (optional), one or more pressure sensors 255 (e.g., atmospheric pressure sensors, water pressure sensors (when underwater), etc.) (optional), one or more air quality sensors 260 (e.g., CO sensors, toxic gas sensors, pollution sensors, etc.) (optional), one or more humidity sensors 265 (optional), one or more proximity sensors 270 (e.g., for sensing proximity to user devices, to IoT-devices, to emergency response devices, to safe zone transponders, to other locations, etc.) (optional), one or more location sensors 275 (e.g., global positioning system ("GPS") devices, global navigation satellite system ("GNSS") devices, relative position sensors, other location sensors, etc.) (optional), one or more other sensors 280 (optional), and/or the like. In some instances, the one or more other sensors 280 might include, but are not limited to, one or more light sensors (e.g., ambient light sensors, luminosity sensors, illuminance sensors, solar light sensors, etc.), a flame detector, an atmospheric oxygen level monitor, an atmospheric carbon dioxide level monitor, an atmospheric nitrogen level monitor, a smoke detector, one or more toxicity sensors (e.g., skin toxicity monitors, gas toxicity monitors, liquid toxicity monitors, poison detectors, carcinogen detectors, etc.), a carcinogen detector, a radiation sensor, a telecommunications signal sensor, a sound amplitude sensor, a frequency sensor, one or more accelerometers (e.g., for fitness tracking, fall detection, etc.), a moisture sensor, a motion sensor, a wind sensor, a weather sensor, or a seismic sensor, and/or the like.

The I/O device 215, in some cases, might include, without limitation, at least one of the following sets of components: a combination of one or more microphones, one or more speakers (which might be built-in speakers or external speakers connected through an audio jack or the like), one or more audio processors, and/or the like for voice interface functionality; one or more of at least one button, at least one touchscreen user interface, at least one display interface, and/or the like for touch interface functionality; one or more vibration, pressure, or force transducers and/or one or more pressure sensors that enable haptic feedback interface functionality; one or more wireless transceivers that communicate with one or more user devices associated with the user using any one or a combination of the wireless protocols described herein (including, but not limited to, 2.4 GHz or 5 GHz WiFi, Bluetooth, Z-wave, ZigBee, etc.) for wireless communication interface functionality; and/or the like. In some cases, the communications transceivers 230 might provide communications (either wired or wireless) between the first IoT-capable device 105 and the computing system 130 via network(s) 135, might provide machine-to-machine communications (either wired or wireless) between the first IoT-capable device 105 and each of the second IoT-capable devices 120a-120n, might provide machine-to-machine communications (either wired or wireless) between the first IoT-capable device 105 and each of the user devices 125a-125n, might provide machine-to-machine communications (either wired or wireless) between the first IoT-capable device 105 and each of the gateway 130c or the computing system 130b, might provide machine-to-machine communications (either wired or wireless) between the first IoT-capable device 105 and each of the third IoT-capable devices 160a-160n, and/or the like.

In some embodiments, the user might speak with the first IoT-capable device 105 to set particular modes, to provide information to the first IoT-capable device 105, to provide commands to the first IoT-capable device 105, to receive alerts as to the condition or state of the system and/or as to the environmental conditions around the user, to receive suggestions as to courses of action to take in response to sensor data, to receive notifications as to what devices the first IoT-capable device 105 is communicating with (or is about to communicate with) and as to what actions are being performed (or will be performed) as well as updates to the situation, and/or the like. Alternatively, or additionally, the user might interact with the first IoT-capable device 105 via one or more of at least one button, at least one touchscreen user interface, at least one display interface to perform one or more of these functions. In another alternative or additional embodiment, the user might interact with the first IoT-capable device 105 via haptic feedback interface, with one or more vibration, pressure, or force transducers providing haptic feedback to the user as a means of provide the user with the alerts, suggestions, notifications, and updates, while one or more pressure sensors might sense (and interpret) the user's response, commands, etc. In yet another alternative or additional embodiment, the user might interact with the first IoT-capable device 105 via one or more user devices 125a-125n (including, but not limited to, a tablet computer, a smart phone, a mobile phone, a personal digital assistant, a desktop computer, a television, a set-top box, a gaming console, a portable gaming device, a human interface device (such as the IoT human interface device as described in detail in the '764 and '710 applications, which have already been incorporated herein by reference in their entirety), and/or the like) that are associated with the user and that are in wireless communication with the first IoT-capable device 105.

The first IoT-capable 105, the IoT-capable sensors 235-280, the second IoT-capable devices 120a-120n, the user devices 125a-125n, the gateway 130c, the computing system 130b, the network(s) 135, and the third IoT-capable devices 160a-160n of system 200 in FIG. 2 are otherwise similar, if not identical, to the first IoT-capable 105, the IoT-capable sensors 115a-115n, the second IoT-capable devices 120a-120n, the user devices 125a-125n, the computing system 130a, the remote computing system 130b, the network(s) 135, and the third IoT-capable devices 160a-160n, respectively, of system 100 in FIG. 1, and the descriptions of these components of system 100 are applicable to the corresponding components of system 200, respectively.

Figure 3A:
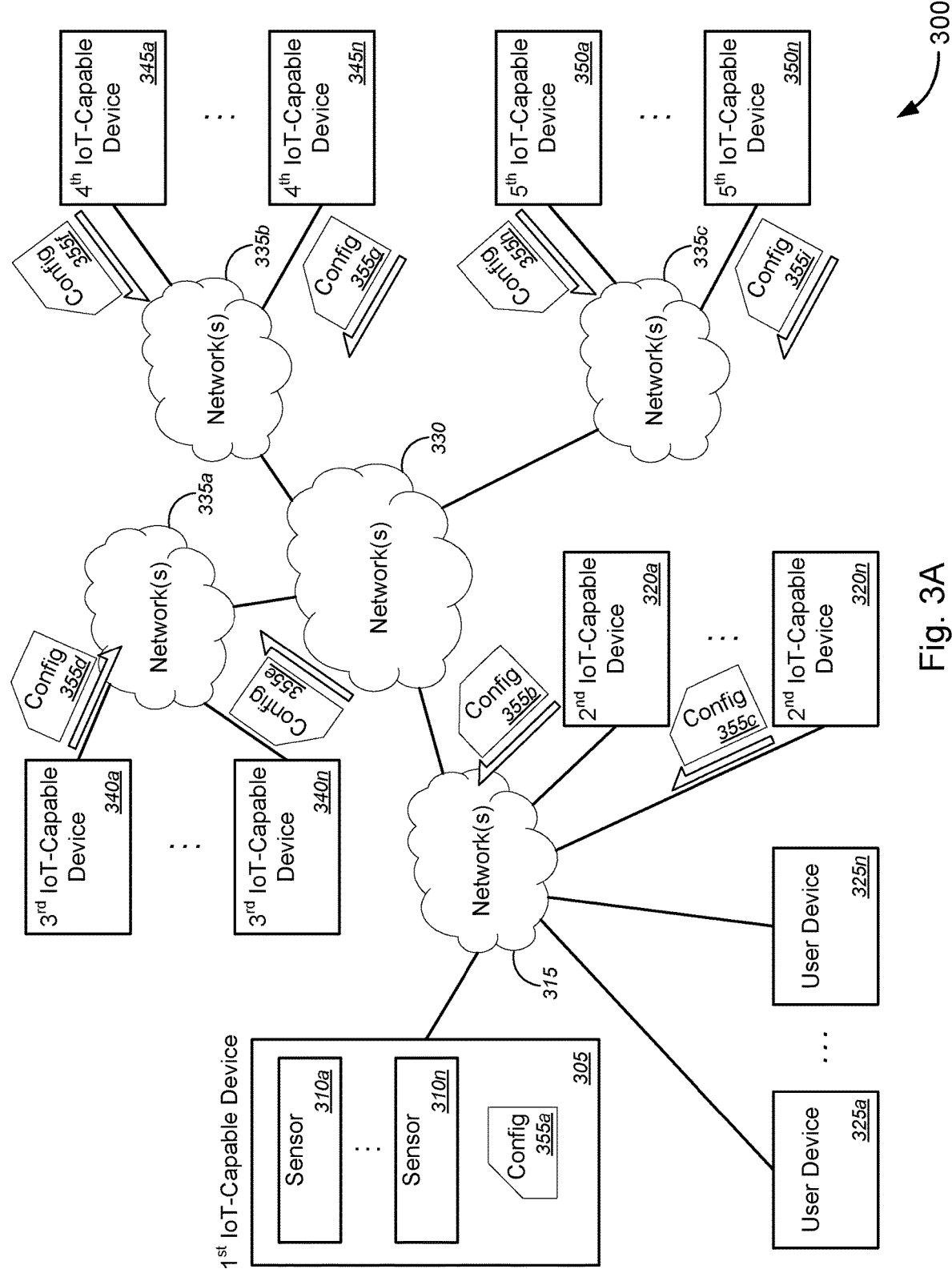
FIGS. 3A and 3B are schematic diagrams illustrating various systems for implementing IoT functionality for shared devices with public and private instances, in accordance with various embodiments.
Figure 3B:
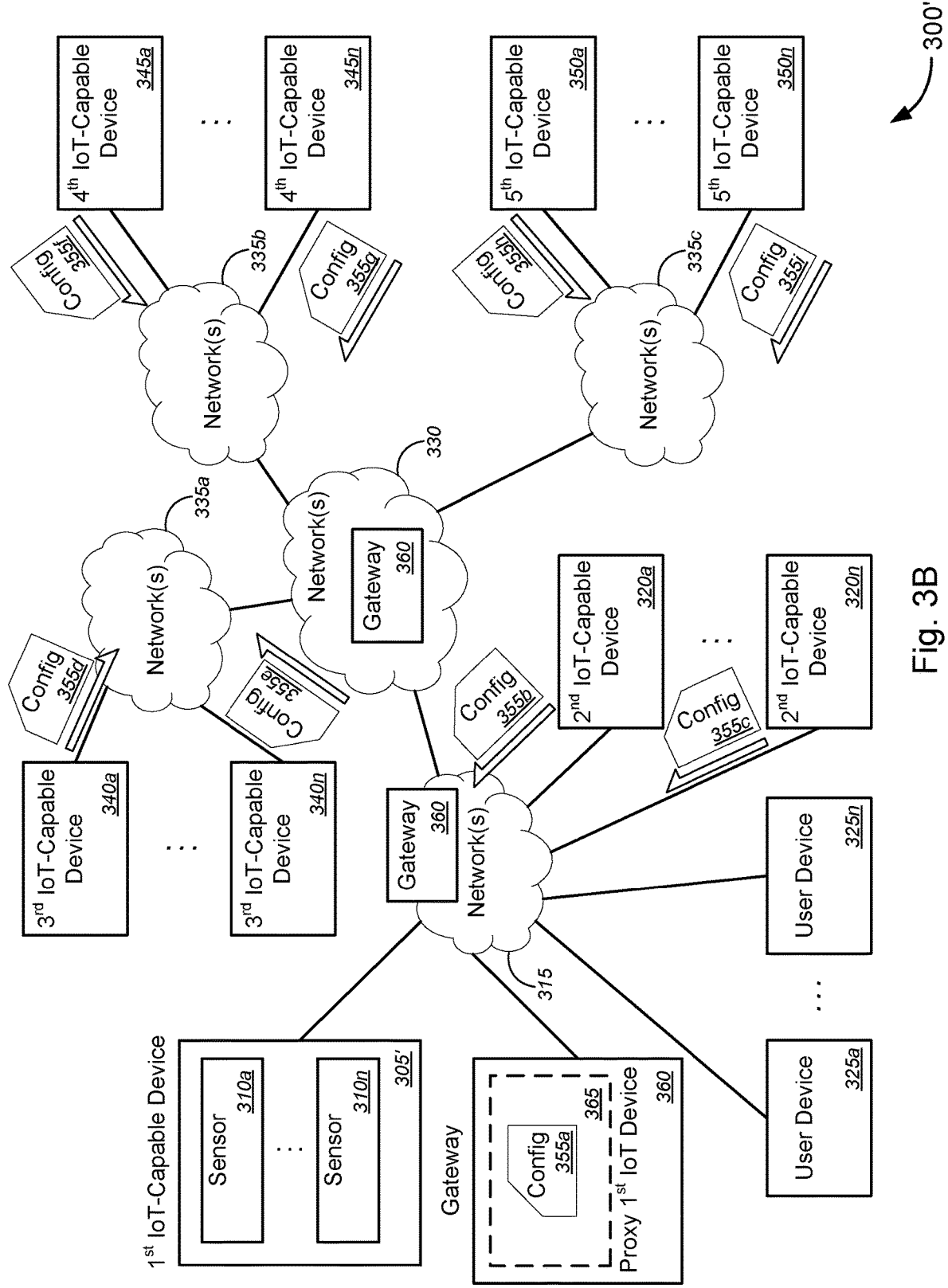

FIGS. 3A and 3B (collectively, "FIG. 3") are schematic diagrams illustrating various systems 300 and 300' for implementing IoT functionality for shared devices with public and private instances, in accordance with various embodiments. According to some embodiments, some IoT-capable devices may be capable of being reconfigured by other devices during the time that these other devices have access to the resources of the IoT-capable devices. FIG. 3A depicts such embodiments, in which the configuration file and/or configuration profiles of a first IoT-capable device 305 can be modified or replaced with another configuration file by another device (e.g., second IoT-capable devices 320a-320n, third IoT-capable devices 340a-340n, fourth IoT-capable devices 345a-345n, fifth IoT-capable devices 350a-350n, and so on). In other embodiments, some IoT-capable devices may not be able to support configuration data and profiles local to itself, but rely on an IoT gateway or the like to act as a proxy. FIG. 3B depicts such embodiments, in which the configuration file and/or configuration profiles of a first IoT-capable device 305, as embodied by a configuration file and/or configuration profiles of a proxy device in a gateway 360, can be modified or replaced with another configuration file by another device (e.g., second IoT-capable devices 320a-320n, third IoT-capable devices 340a-340n, fourth IoT-capable devices 345a-345n, fifth IoT-capable devices 350a-350n, and so on).

With reference to FIG. 3A, system 300 might comprise a first IoT-capable device 305, one or more sensors 310a-310n (collectively, "IoT-capable sensors 310," "IoT sensors 310," or "sensors 310") that may be disposed within the first IoT-capable device 305 and/or disposed external to the first IoT-capable device 305, a network(s) 315, one or more second IoT-capable devices 320a-320n (collectively, "second IoT-capable devices 320," "IoT devices 320," or "devices 320"), one or more user devices 325a-325n (collectively, "user devices 325" or "devices 325"), and/or the like that either may be associated with the user and/or may be located at a customer premises associated with the user. System 300 might further comprise one or more networks 330 that communicatively couple to networks 335a, 335b, 335c, and so on, that are associated with various third parties. System 300, in some embodiments, might comprise one or more third IoT-capable devices 340a-340n (collectively, "third IoT-capable devices 340," "IoT devices 340," or "devices 340") that communicatively couple with the devices 305, 320, and 325 of network(s) 315 via network(s) 335a and network(s) 330, one or more fourth IoT-capable devices 345a-345n (collectively, "fourth IoT-capable devices 345," "IoT devices 345," or "devices 345") that communicatively couple with the devices 305, 320, and 325 of network(s) 315 via network(s) 335b and network(s) 330, one or more fifth IoT-capable devices 350a-350n (collectively, "fifth IoT-capable devices 350," "IoT devices 350," or "devices 350") that communicatively couple with the devices 305, 320, and 325 of network(s) 315 via network(s) 335c and network(s) 330, and so on.

In some aspects, the first IoT-capable device 305 might comprise one or more configuration files 355a, which might include, without limitation, one or more IoT configuration files, one or more IoT profiles for each of one or more other IoT-capable devices, for each of one or more user devices, and/or for one or more computing devices, and/or the like. Each of at least one of the one or more second IoT-capable devices 320 might also comprise a similar configuration file. For example, the second IoT-capable device 320a might comprise one or more configuration files 355b, while the second IoT-capable device 320n might comprise one or more configuration files 355c, and so on. In a similar manner, each of at least one of the one or more third IoT-capable devices 340 might also comprise a similar configuration file. For example, the third IoT-capable device 340a might comprise one or more configuration files 355d, while the third IoT-capable device 340n might comprise one or more configuration files 355e, and so on. Likewise, each of at least one of the one or more fourth IoT-capable devices 345 might also comprise a similar configuration file. For example, the fourth IoT-capable device 345a might comprise one or more configuration files 355f, while the fourth IoT-capable device 345n might comprise one or more configuration files 355g, and so on. Similarly, each of at least one of the one or more fifth IoT-capable devices 350 might also comprise a similar configuration file. For example, the fifth IoT-capable device 350a might comprise one or more configuration files 355h, while the fifth IoT-capable device 350n might comprise one or more configuration files 355i, and so on.

When the second IoT-capable device 320a has access to the resources of the first IoT-capable device 105, the second IoT-capable device 320a might remotely reconfigure the first IoT-capable device 105 by sending at least one of the one or more configuration files 355b to replace configuration file(s) 355a. In some cases, if the one or more configuration files 355a comprises a profile of configurations that already includes the at least one configuration file 355b or a substantially identical or compatible configuration file(s), then the second IoT-capable device 320a might remotely reconfigure the first IoT-capable device 105 by activating, selecting, or otherwise setting the at least one configuration file 355b or a substantially identical or compatible configuration file(s) as the active configuration file(s) for the first IoT-capable device 105. In a similar manner, if the one or more configuration files 355a does not already include the corresponding configuration file(s), each of the other second IoT-capable devices 320b-320n, each of the one or more third IoT-capable devices 340a-340n, each of the one or more fourth IoT-capable devices 345a-345n, or each of the one or more fifth IoT-capable devices 350a-350n, and so on, might remotely reconfigure the first IoT-capable device 105 by sending at least one of the one or more configuration files (e.g., configuration file(s) 355c-355i, and/or the like) to replace configuration file(s) 355a. Alternatively, if the one or more configuration files 355a does already include the corresponding configuration file(s), each of the other second IoT-capable devices 320b-320n, each of the one or more third IoT-capable devices 340a-340n, each of the one or more fourth IoT-capable devices 345a-345n, or each of the one or more fifth IoT-capable devices 350a-350n, and so on, might remotely reconfigure the first IoT-capable device 105 by activating, selecting, or otherwise setting the at least one of the one or more configuration files (e.g., configuration file(s) 355c-355i, and/or the like) or a substantially identical or compatible configuration file(s) as the active configuration file(s) for the first IoT-capable device 105.

Turning to FIG. 3B, in which system 300' is identical to system 300 of FIG. 3A, except that the first IoT-capable device 305' is not capable of including any configuration files 355, in which case a gateway device 360 might serve as a proxy first IoT device 365 or might include a virtual proxy first IoT device 365 that includes the one or more configuration files 355a. In some embodiments, the gateway 360 might be physical device (or a virtual gateway hosted within a physical device) that is located at the customer premises. Alternatively, the gateway 360 might be a server or network node (or a virtual gateway hosted within the server or network node) within network(s) 315. In yet other embodiments, the gateway 360 might a server or network node (or a virtual gateway hosted within the server or network node) within service provider network(s) 330.

The first IoT-capable 305, the IoT-capable sensors 310a-310n, the network(s) 315, the second IoT-capable devices 320a-320n, the user devices 325a-325n, the network(s) 330, the network(s) 335a-335c, the third IoT-capable devices 340a-340n, the fourth IoT-capable devices 345a-345n, and the fifth IoT-capable devices 350a-350n, the configuration files 355a-355i of system 300' in FIG. 3B are otherwise similar, if not identical, to the first IoT-capable 305, the IoT-capable sensors 310a-310n, the network(s) 315, the second IoT-capable devices 320a-320n, the user devices 325a-325n, the network(s) 330, the network(s) 335a-335c, the third IoT-capable devices 340a-340n, the fourth IoT-capable devices 345a-345n, and the fifth IoT-capable devices 350a-350n, the configuration files 355a-355i of system 300 in FIG. 3A, and the descriptions of these components of system 300' are applicable to the corresponding components of system 300, respectively.

The first IoT-capable 305, the IoT-capable sensors 310a-310n, the second IoT-capable devices 320a-320n, the user devices 325a-325n, the network(s) 330, the network(s) 335a-335c, each of the third through fifth IoT-capable devices 340a-340n, 345a-345n, and 350a-350n, and the gateway devices 360 of systems 300 and 300' of FIGS. 3A and 3B are otherwise similar, if not identical, to the first IoT-capable 105, the IoT-capable sensors 115a-115n and 235-280, the second IoT-capable devices 120a-120n, the user devices 125a-125n, the network(s) 135, the network(s) 135, the third IoT-capable devices 160a-160n, and the computing systems 130a-130c, respectively, of systems 100 and 200 of FIGS. 1 and 2, and the descriptions of these components of system 300 or 300' are applicable to the corresponding components of system 100 or 200.

In some embodiments, where multiple first IoT-capable devices 305 can be configurable by an external IoT community server or third party server or device either directly or through an IoT gateway proxy (e.g., proxy device 365 of gateway 360 or the like), it may be appropriate to multicast configurations to multiple IoT devices simultaneously or concurrently. Some IoT community servers may elect to always send IoT configurations prior to polling a shared IoT device to ensure a known state and configuration. After receiving the polled data and/or the sensor data, the IoT device might reset itself to the user's configuration or to its own configuration. Alternatively, the IoT community server may first learn the current configuration of the IoT device, update/modify the configuration, poll the data (either the sensor data and/or other data), and subsequently restore the configuration to the state that it was in before (i.e., the IoT community server performs the restoration of the IoT device's configuration, rather than the IoT device resetting its configuration). Again, this could be done directly or through a gateway proxy.

According to some embodiments, particularly in IoT devices with minimal or no configurability, the IoT device may not be able to be polled. The community server may instead be in a listen-only mode relative to the IoT device. Alternatively, the IoT community server may be able to negotiate or specify a time when the IoT device provides sensor data to the community. The owner of the shared IoT device(s) can, at any time, unregister or de-register his or her device(s) from a community.

Figure 4A:
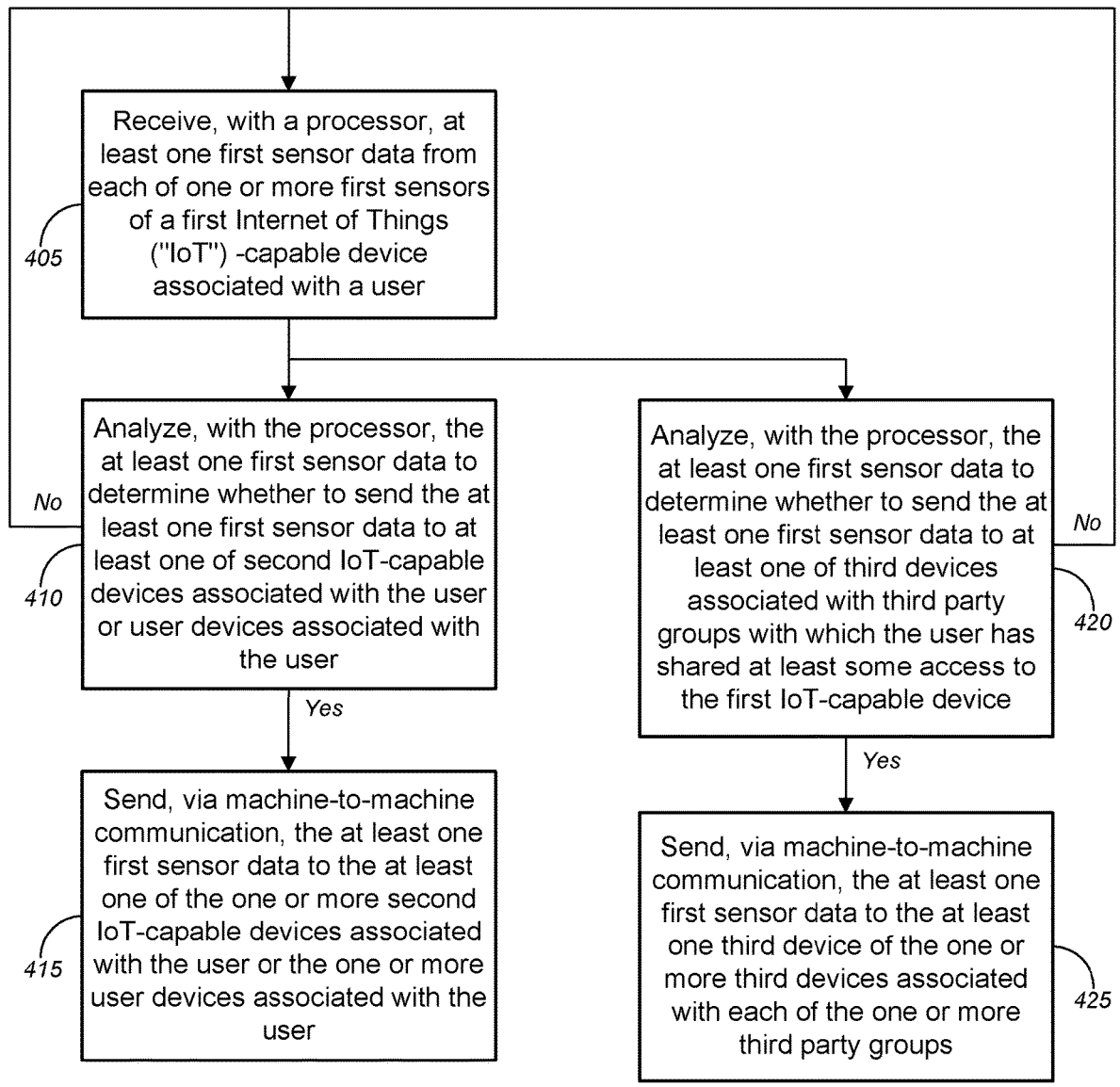
FIGS. 4A-4E are flow diagrams illustrating a method for implementing IoT functionality for shared devices with public and private instances, in accordance with various embodiments.

FIGS. 4A-4E (collectively, "FIG. 4") are flow diagrams illustrating a method 400 for implementing IoT functionality for shared devices with public and private instances, in accordance with various embodiments. FIG. 4A depicts the method for implementing IoT functionality for shared devices with public and private instances, while FIGS. 4B-4E each depicts various embodiments for implementing each of four processes in the method of FIG. 4A that are involved with implementing IoT functionality for shared devices with public and private instances.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, 300, and 300' of FIGS. 1, 2, 3A, and 3B respectively (or components thereof), such methods may also be implemented using any suitable hardware (or software) implementation. Similarly, while each of the systems 100, 200, 300, and 300' of FIGS. 1, 2, 3A, and 3B, respectively (or components thereof), can operate according to the method 400 illustrated by FIG. 4 (e.g., by executing instructions embodied on a computer readable medium), the systems 100, 200, 300, and 300' of FIGS. 1, 2, 3A, and 3B can each also operate according to other modes of operation and/or perform other suitable procedures.

In FIG. 4A, method 400, at block 405, might comprise receiving, with a processor, at least one first sensor data from each of one or more first sensors (which might correspond to Built-In IoT-capable sensors 115a-115n, 235-280, and 310a-310n of FIGS. 1-3, or the like) of a first Internet of Things ("IoT")-capable device (which might correspond to first IoT-capable device 105, 305, and 305' of FIGS. 1-3, or the like) that is associated with a user. According to some embodiments, the processor might be a processor of the first IoT-capable device. Alternatively, or additionally, the processor might be at least one of a processor of a customer premises gateway device, a processor of a network gateway device, a processor of an IoT gateway device, or a processor of an IoT human interface device, and/or the like. In some embodiments, the one or more first sensors might include, without limitation, at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a gas toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor, and/or the like.

At block 410, method 400 might comprise analyzing, with the processor, the at least one first sensor data to determine whether to send the at least one first sensor data to at least one of second IoT-capable devices associated with the user (which might correspond to second IoT-capable devices 120a-120n and 320a-320n of FIGS. 1-3, or the like) or user devices associated with the user (which might correspond to user devices 125a-125n and 325a-325n of FIGS. 1-3, or the like). Based on a determination to send the at least one first sensor data to at least one of one or more second IoT-capable devices associated with the user or one or more user devices associated with the user, method 400 might further comprise sending, via machine-to-machine communication, the at least one first sensor data to the at least one of the one or more second IoT-capable devices associated with the user or the one or more user devices associated with the user (block 415). Based on a determination to not send the at least one first sensor data to at least one of one or more second IoT-capable devices associated with the user or one or more user devices associated with the user, method 400 might return to block 405.

In some embodiments, the processor might be one of the processor of the customer premises gateway device, the processor of the network gateway device, the processor of the IoT gateway device, or the processor of the IoT human interface device, and/or the like. Sending the at least one first sensor data to the at least one of the one or more second IoT-capable devices associated with the user or the one or more user devices associated with the user might comprise sending, by the first IoT-capable device, the at least one first sensor data to the at least one of the one or more second IoT-capable devices associated with the user or the one or more user devices associated with the user, in response to command instructions from the one of the processor of the customer premises gateway device, the processor of the network gateway device, the processor of the IoT gateway device, or the processor of the IoT human interface device to send the at least one first sensor data to the at least one of the one or more second IoT-capable devices or the one or more user devices.

In some cases, the processor might be the processor of the first IoT-capable device. Sending the at least one first sensor data to the at least one of the one or more second IoT-capable devices associated with the user or the one or more user devices associated with the user might comprise autonomously sending, by the first IoT-capable device, the at least one first sensor data to the at least one of the one or more second IoT-capable devices associated with the user or the one or more user devices associated with the user.

According to some embodiments, sending the at least one first sensor data to the at least one of the one or more second IoT-capable devices associated with the user or the one or more user devices associated with the user, based on determination to send the at least one first sensor data to at least one of one or more second IoT-capable devices associated with the user or one or more user devices associated with the user, might comprise sending, by the first IoT-capable device, the at least one first sensor data to the at least one of the one or more second IoT-capable devices associated with the user or the one or more user devices associated with the user, in response to a sensor polling request from the at least one of the one or more second IoT-capable devices associated with the user or the one or more user devices associated with the user.

Alternatively, or additionally, method 400, at block 420, might comprise analyzing, with the processor, the at least one first sensor data to determine whether to send the at least one first sensor data to at least one of third devices (which might correspond to third IoT-capable devices 160*a*-160*n* and 340*a*-340*n* of FIGS. 1-3, fourth IoT-capable devices 345*a*-345*n* and/or Fifth IoT-capable devices 350*a*-350*n* of FIG. 3, or the like) associated with third party groups (e.g., third party 155 of FIG. 1) with which the user has shared at least some access to the first IoT-capable device. Based on a determination to send the at least one first sensor data to at least one of one or more third devices associated with each of the one or more third party groups, method 400 might further comprise sending, via machine-to-machine communication, the at least one first sensor data to the at least one third device of the one or more third devices associated with each of the one or more third party groups (block 425). Based on a determination to not send the at least one first sensor data to at least one of one or more third devices associated with each of the one or more third party groups, method 400 might return to block 405.

In some embodiments, the processor might be one of the processor of the customer premises gateway device, the processor of the network gateway device, the processor of the IoT gateway device, or the processor of the IoT human interface device, and/or the like. Sending the at least one first sensor data to the at least one third device of the one or more third devices associated with each of the one or more third party groups might comprise sending, by the first IoT-capable device, the at least one first sensor data to the at least one third device of the one or more third devices associated with each of the one or more third party groups, in response to command instructions from the one of the processor of the customer premises gateway device, the processor of the network gateway device, the processor of the IoT gateway device, or the processor of the IoT human interface device to send the at least one first sensor data to the at least one third device.

In some cases, the processor might be the processor of the first IoT-capable device. Sending the at least one first sensor data to the at least one third device of the one or more third devices associated with each of the one or more third party groups might comprise autonomously sending, by the first IoT-capable device, the at least one first sensor data to the at least one third device of the one or more third devices associated with each of the one or more third party groups.

According to some embodiments, sending the at least one first sensor data to the at least one third device of the one or more third devices associated with each of the one or more third party groups, based on a determination to send the at least one first sensor data to at least one of one or more third devices associated with each of the one or more third party groups, might comprise sending, by the first IoT-capable device, the at least one first sensor data to the at least one third device of the one or more third devices associated with each of the one or more third party groups, in response to a sensor polling request from the at least one third device of the one or more third devices associated with each of the one or more third party groups.

Figure 4B:
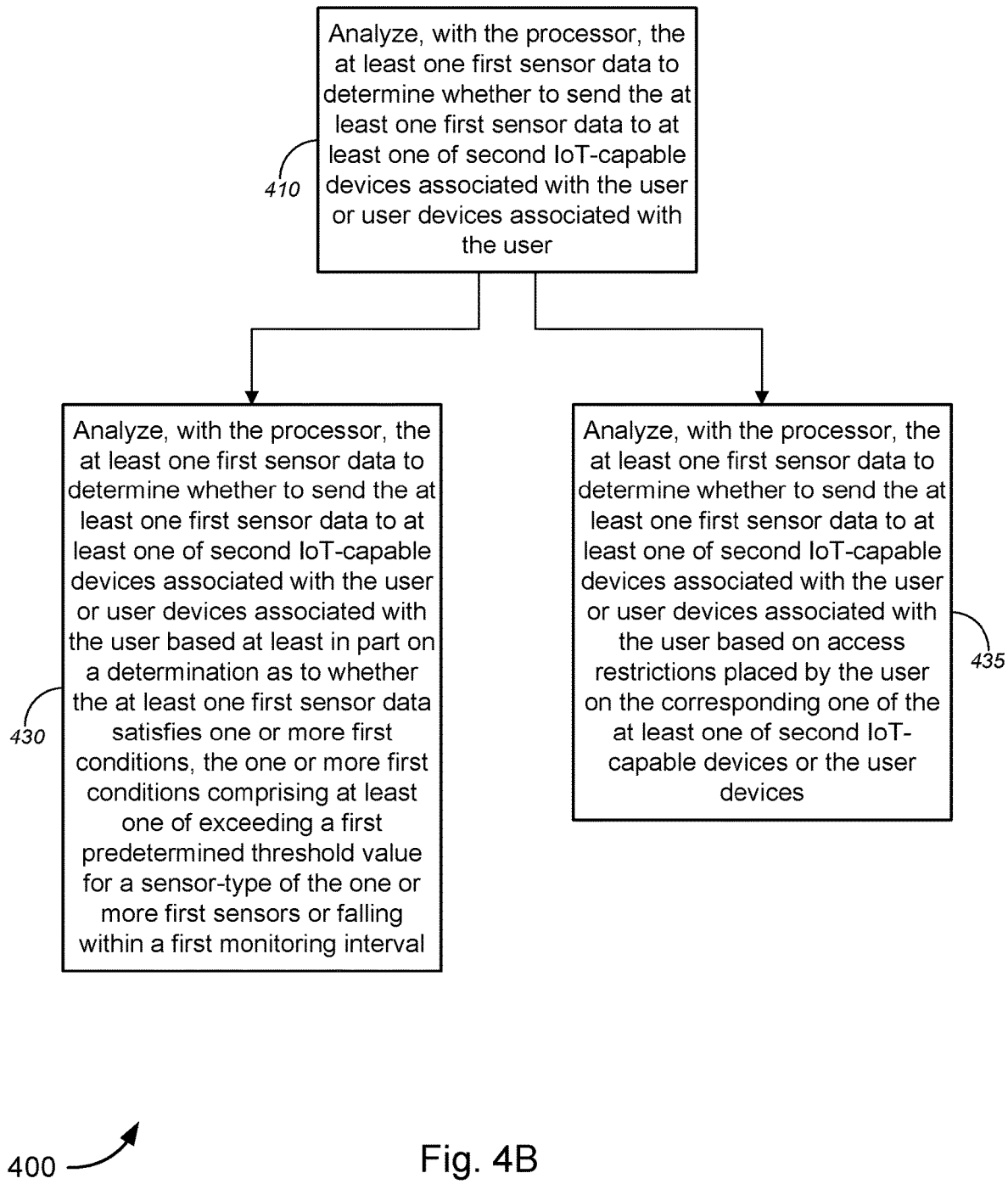

With reference to FIG. 4B, analyzing the at least one first sensor data to determine whether to send the at least one first sensor data to at least one of second IoT-capable devices associated with the user or user devices associated with the user (at block 410) might comprise analyzing, with the processor, the at least one first sensor data to determine whether to send the at least one first sensor data to at least one of second IoT-capable devices associated with the user or user devices associated with the user based at least in part on a determination as to whether the at least one first sensor data satisfies one or more first conditions (block 430). The one or more first conditions might include, but are not limited to, at least one of exceeding a first predetermined threshold value for a sensor-type of the one or more first sensors or falling within a first monitoring interval, and/or the like.

Alternatively, or additionally, analyzing the at least one first sensor data to determine whether to send the at least one first sensor data to at least one of second IoT-capable devices associated with the user or user devices associated with the user (at block 410) might comprise analyzing, with the processor, the at least one first sensor data to determine whether to send the at least one first sensor data to at least one of second IoT-capable devices associated with the user or user devices associated with the user based on access restrictions placed by the user on the corresponding one of the at least one of second IoT-capable devices or the user devices (block 435). The access restrictions might include, without limitation, one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like.

Figure 4C:
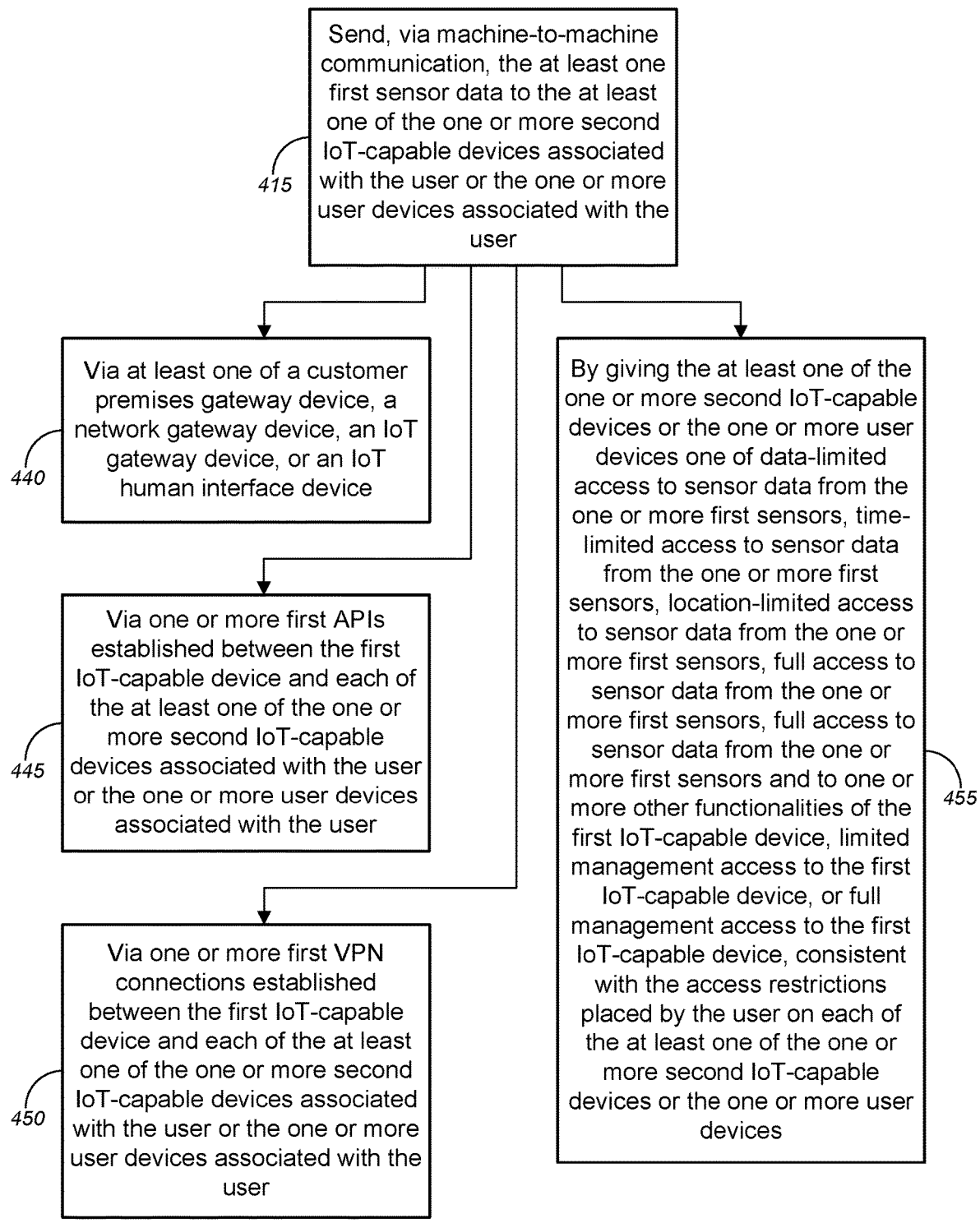

Turning to FIG. 4C, sending the at least one first sensor data to the at least one of the one or more second IoT-capable devices associated with the user or the one or more user devices associated with the user (at block 415) might comprise sending, via machine-to-machine communication, the at least one first sensor data to the at least one of the one or more second IoT-capable devices associated with the user or the one or more user devices associated with the user, by one of more of: via at least one of a customer premises gateway device, a network gateway device, an IoT gateway device, or an IoT human interface device, and/or the like (block 440); via one or more first application programming interfaces ("APIs") established between the first IoT-capable device and each of the at least one of the one or more second IoT-capable devices associated with the user or the one or more user devices associated with the user (block 445); or via one or more first virtual private network ("VPN") connections established between the first IoT-capable device and each of the at least one of the one or more second IoT-capable devices associated with the user or the one or more user devices associated with the user (block 450); and/or the like.

With reference to the processes at block 435 of FIG. 4B, in embodiments in which access restrictions are placed by the user on the corresponding one of the at least one of second IoT-capable devices or the user devices, sending the at least one first sensor data to the at least one of the one or more second IoT-capable devices associated with the user or the one or more user devices associated with the user (at block 415) might comprise sending, via machine-to-machine communication, the at least one first sensor data to the at least one of the one or more second IoT-capable devices associated with the user or the one or more user devices associated with the user, by giving the at least one of the one or more second IoT-capable devices or the one or more user devices one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like consistent with the access restrictions placed by the user on the corresponding one or more of the at least one of one or more second IoT-capable devices or the one or more user devices (block 455).

Figure 4D:
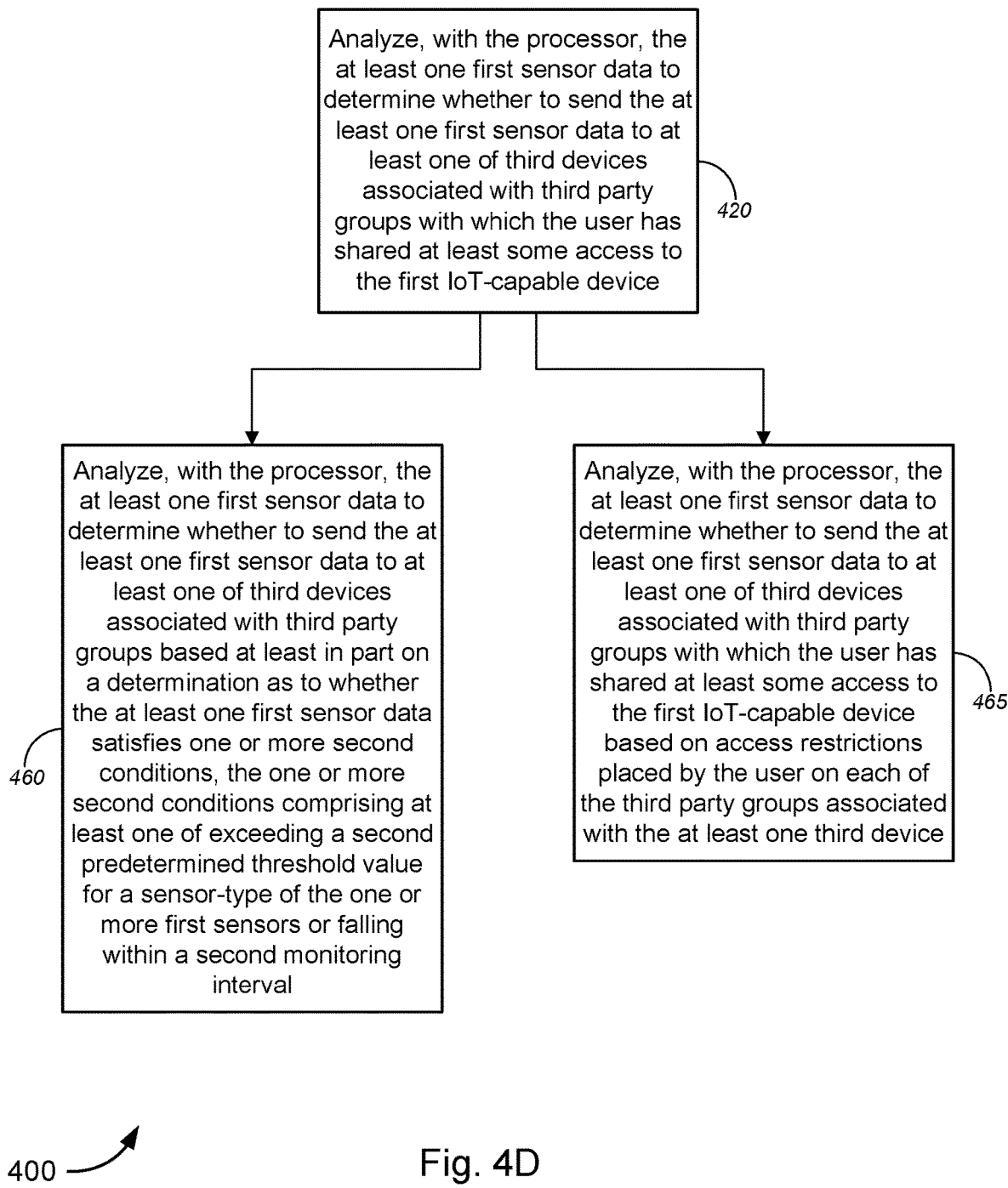

Referring to FIG. 4D, analyzing the at least one first sensor data to determine whether to send the at least one first sensor data to at least one of third devices associated with third party groups with which the user has shared at least some access to the first IoT-capable device (at block 420) might comprise analyzing, with the processor, the at least one first sensor data to determine whether to send the at least one first sensor data to at least one of third devices associated with third party groups based at least in part on a determination as to whether the at least one first sensor data satisfies one or more second conditions (block 460). The one or more second conditions might include, but are not limited to, at least one of exceeding a second predetermined threshold value for a sensor-type of the one or more first sensors or falling within a second monitoring interval, and/or the like. In some embodiments, at least one of the one or more second conditions might be different from at least one of the one or more first conditions (as described above with respect to block 435).

Alternatively, or additionally, analyzing the at least one first sensor data to determine whether to send the at least one first sensor data to at least one of third devices associated with third party groups with which the user has shared at least some access to the first IoT-capable device (at block 420) might comprise analyzing, with the processor, the at least one first sensor data to determine whether to send the at least one first sensor data to at least one of third devices associated with third party groups based on access restrictions placed by the user on each of the third party groups associated with the at least one third device (block 465). The access restrictions might include, without limitation, one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like.

Figure 4E:
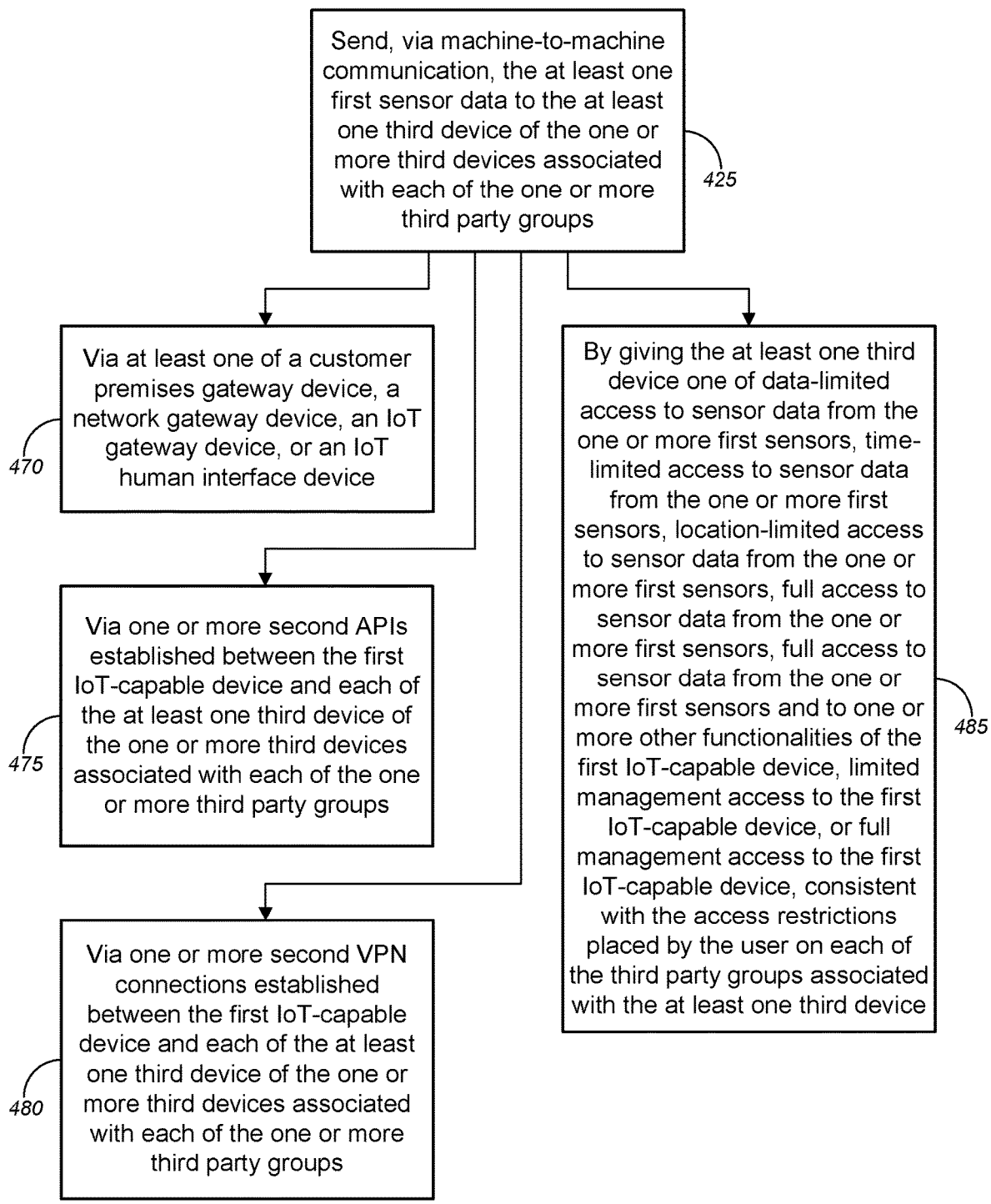

Turning to FIG. 4E, sending the at least one first sensor data to the at least one third device of the one or more third devices associated with each of the one or more third party groups (at block 415) might comprise sending, via machine-to-machine communication, the at least one first sensor data to the at least one third device of the one or more third devices associated with each of the one or more third party groups, by one of more of: via at least one of a customer premises gateway device, a network gateway device, an IoT gateway device, or an IoT human interface device, and/or the like (block 470); via one or more second APIs established between the first IoT-capable device and each of the at least one third device of the one or more third devices associated with each of the one or more third party groups (block 475); or via one or more second VPN connections established between the first IoT-capable device and each of the at least one third device of the one or more third devices associated with each of the one or more third party groups (block 480); and/or the like.

With reference to the processes at block 465 of FIG. 4D, in embodiments in which access restrictions are placed by the user on each of the third party groups associated with the at least one third device, sending the at least one first sensor data to the at least one third device of the one or more third devices associated with each of the one or more third party groups (at block 425) might comprise sending, via machine-to-machine communication, the at least one first sensor data to the at least one third device of the one or more third devices associated with each of the one or more third party groups, by giving the at least one third device one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like, consistent with the access restrictions placed by the user on each of the third party groups associated with the at least one third device (block 485).

Figure 5A:
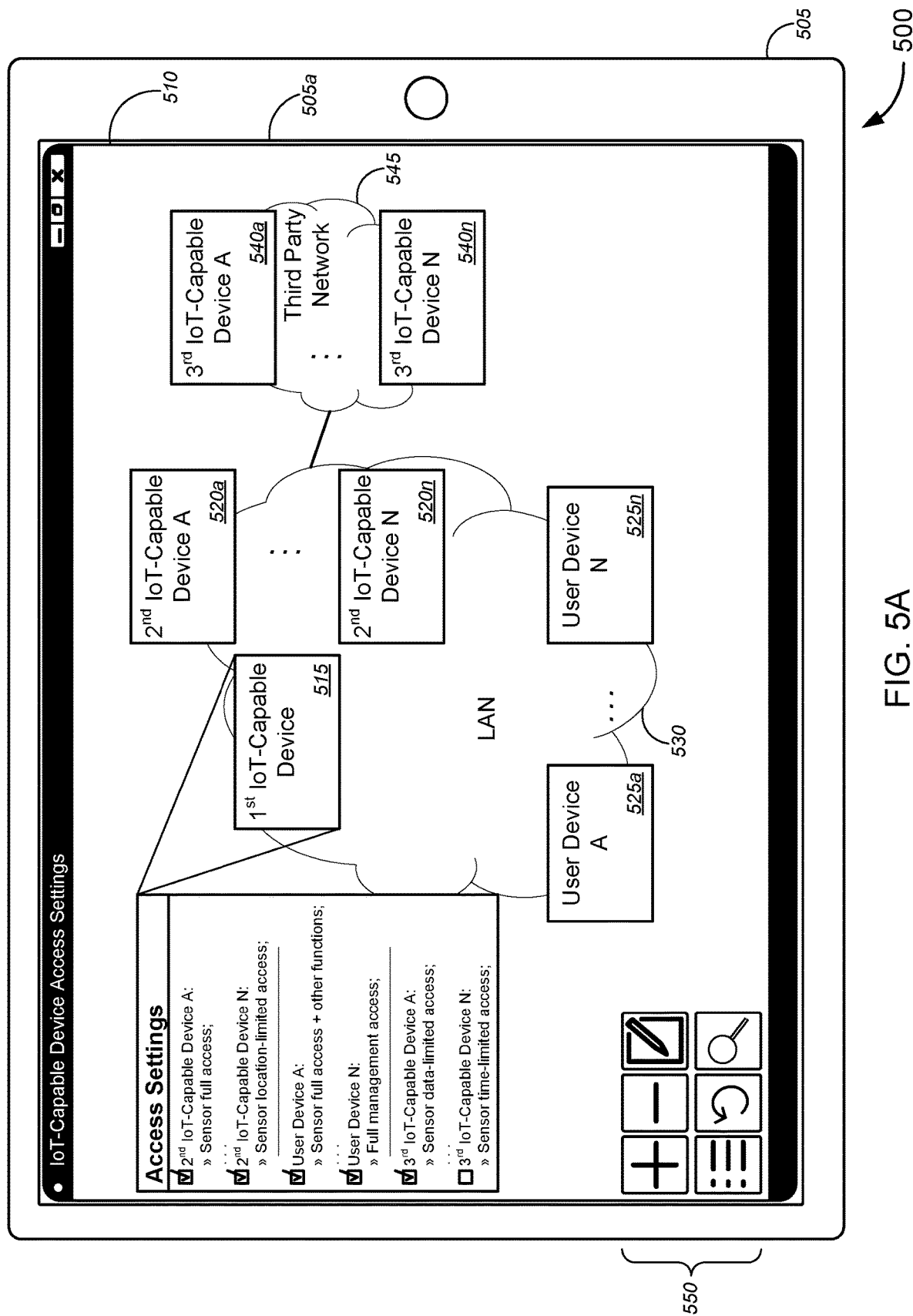
FIGS. 5A and 5B are exemplary illustrations of user devices used by users that present graphical user interfaces configured for providing options for users to configure access settings for implementing IoT functionality for shared devices with public and private instances, in accordance with various embodiments.
Figure 5B:
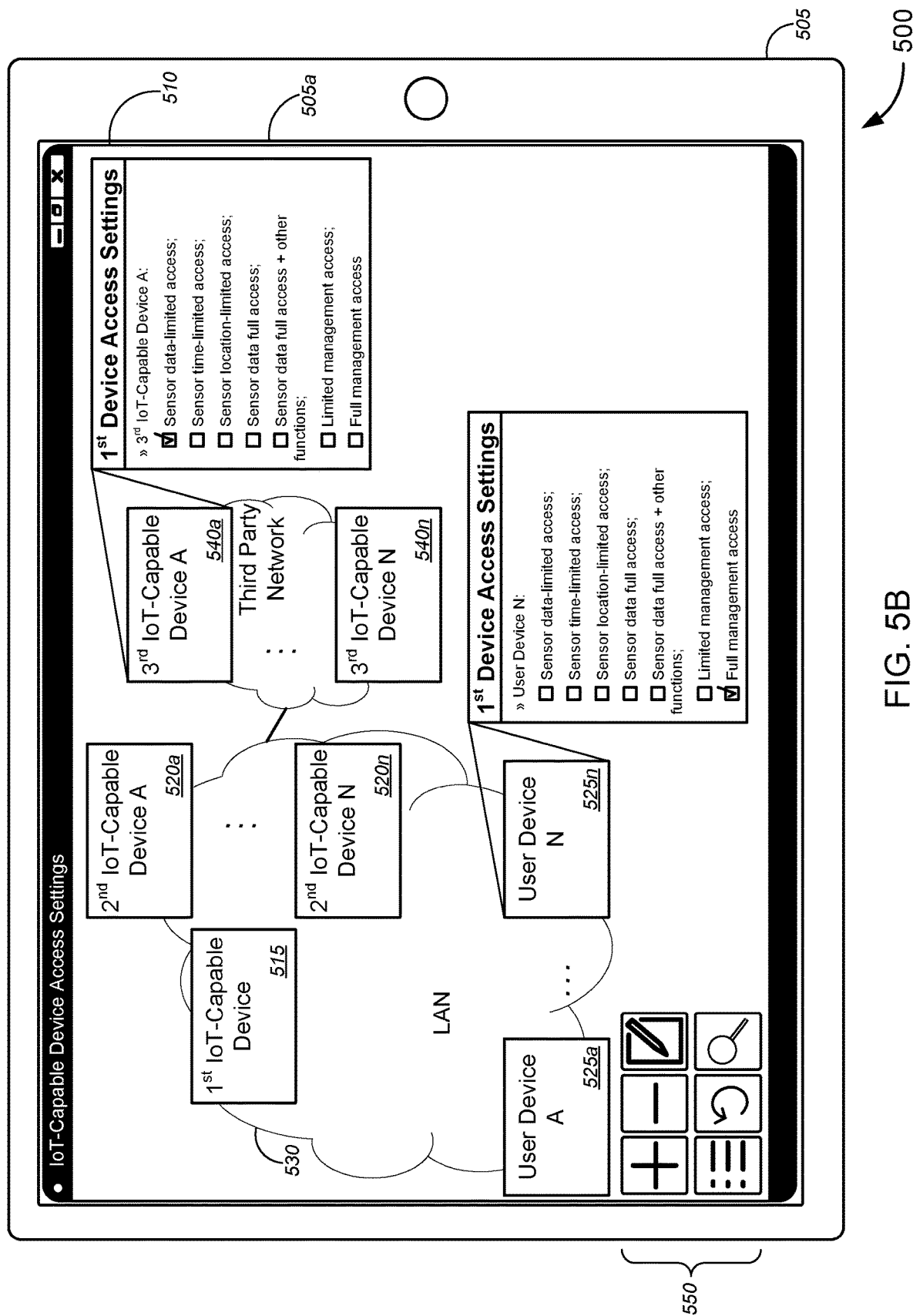

FIGS. 5A and 5B (collectively, "FIG. 5") are exemplary illustrations of user devices 500 used by users that present graphical user interfaces configured for providing options for users to configure access settings for implementing IoT functionality for shared devices with public and private instances, in accordance with various embodiments. The embodiments as represented in FIG. 5 are merely illustrative and are not intended to limit the scope of the various embodiments. For example, although the graphical user interfaces of FIG. 5 depict a line-by-line or line-to-line type GUI, various embodiments may employ a drag-and-drop type GUI (not shown) that allows for more intuitive graphical interaction between the user and the icons representing user devices, IoT devices, network devices, hardware resources, network resources, networks, permissions, and/or the like.

In FIG. 5, although a tablet computer is shown as the user device 500, any suitable user device—including, but not limited to, any of user devices 125*a*-125*n* and/or 325*a*-325*n*, which might include, without limitation, at least one of at least one of a tablet computer, a smart phone, a mobile phone, a personal digital assistant, a desktop computer, a television, a set-top box, a gaming console, a portable gaming device, a human interface device (such as the IoT human interface device as described in detail in the '764 and '710 applications), and/or the like that are associated with the user and that are in wireless communication with the first IoT-capable devices 105, with at least one of the one or more second IoT-capable devices 120, and/or with at least one of the one or more user devices 125, as described in detail above with respect to FIGS. 1-4—may be used in accordance with the various embodiments. As shown in the embodiments of FIG. 5, user device 500 might comprise a device housing 505 and a display 505*a* (which may be a touchscreen display or a non-touchscreen display). An app, an application window, or program window may be displayed on the display 505*a*. In the various examples of FIG. 5, the app 510 running on the user device 500 is an IoT-Capable Device Access Settings app, although the various embodiments are not limited to such an app for providing Customer-based IoT, as described herein, and can be any suitable app or program. The app or app window 510 displayed in display 505*a* might provide a user with the ability, functionality, or options to map and modify access to one or more IoT-capable devices, user devices, and/or hardware/network resources.

With reference to FIGS. 5A and 5B, the app might display a first IoT-capable device 515, one or more second IoT-capable devices 520 (including second IoT-capable device A 520*a* through second IoT-capable device N 520*n*, or the like), one or more user devices 525 (including user device A 525*a* through user device N 525*n*, or the like), an icon/graphic of a local area network ("LAN") 530 (in which the first IoT-capable device 515, the one or more second IoT-capable devices 520, and the one or more user devices 525 reside), one or more third IoT-capable devices 540 (including third IoT-capable device A 540*a* through third IoT-capable device N 540*n*, or the like), and an icon/graphic of a third party network 545 (in which the one or more third IoT-capable devices 540 reside).

The app 510 might also display control icons or buttons 550, including buttons (typically, soft buttons or the like) for adding/registering new IoT-capable devices, user devices, new hardware/network resources, new third party servers, new networks (including third party networks), new third party IoT-devices, etc.; for removing/de-registering IoT-capable devices, user devices, hardware/network resources, third party servers, networks, third party IoT-devices, etc.; for editing mapping, access, and/or communications options for particular or selected IoT-capable devices, user devices, hardware/network resources, third party servers, networks, third party IoT-devices, and/or the like; for accessing menu options; for undoing changes; for searching for particular IoT-capable devices, user devices, hardware/network resources, third party servers, networks, third party IoT-devices, etc.; and/or the like.

In the non-limiting embodiment of FIG. 5A, selecting or highlighting the first IoT-capable device 515 might display a pop-up window or panel that provides access setting options, including, but not limited to, providing the user with options to provide or deny particular other devices with access to sensors and other resources of the first IoT-capable device 515. For example, in some embodiments, the pop-up window or panel might display a list of available other devices (e.g., the one or more second IoT-capable devices A through N 520*a*-520*n*, the one or more user devices A through N 525*a*-525*n*, the one or more third IoT-capable devices A through N 540*a*-540*n*, or the like) that may be in communication with the first IoT-capable device 515 via one or more networks (e.g., LAN 530 and/or third party network 545, and/or any intermediate networks, or the like). According to some embodiments, selection may be made by actuating, toggling, or otherwise selecting one or more of these listed devices. Although checkboxes are displayed beside each of these listed devices in the embodiment of FIG. 5A, the various embodiments are not so limited, and selection/de-selection may be made using any one of checkboxes, radial buttons, virtual buttons, virtual switches, highlighted text, highlighted icons, and/or the like.

As shown in FIG. 5A, access might be granted to, for example, each of the second IoT-capable device A 520*a*, the second IoT-capable device N 520*n*, the user device A 525*a*, the user device N 525*n*, and the third IoT-capable device A 540*a* (as denoted by the checked checkboxes beside these devices), but not granted to the third IoT-capable device n 540*n* (as denoted by the unchecked checkbox beside this device. (Note that the other second IoT-capable devices 520*b*-520(*n*−1), the other user devices 525*b*-525(*n*−1), the other third IoT-capable devices 540*b*-540(*n*−1), etc. are not shown, as the lists are collapsed for ease of illustration.) The level of access given to each device (also referred to herein as "access restrictions)—which might include, without limitation, one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like—is indicated under each device in the list. For example, the second IoT-capable device A 520a is granted full access to sensor data, while the second IoT-capable device N 520n is granted location-limited access to sensor data, and the user device A 525a is granted full access to sensor data in addition to one or more other functions or functionalities of the first IoT-capable device 515, while the user device N 525n is granted full management access to the first IoT-capable device 515 (including all sensor data access, all sensor full control, full access and control over all other functions or functionalities, access control management, and/or the like), and the third IoT-capable device A 540a is granted data-limited access to sensor data. Although not granted any access to the first IoT-capable device (as denoted by the unchecked checkbox), the third IoT-capable device N 540n (if the checkbox were to be checked) might be, based on the current settings, granted time-limited access to the sensor data.

Turning to FIG. 5B, selecting or highlighting each of the other devices (e.g., the one or more second IoT-capable devices A through N 520a-520n, the one or more user devices A through N 525a-525n, the one or more third IoT-capable devices A through N 540a-540n, or the like) might display a pop-up window or panel that provides access setting options for allowing such other device to access the first IoT-capable device 515. For example, selecting or highlighting the third IoT-capable device A 540a might display a pop-up window or panel that allows the user to select one of the access restrictions against this device, including, but not limited to, one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like. In the non-limited embodiment of FIG. 5B, data-limited access is selected. As with the pop-up window or panel in FIG. 5A, although checkboxes are displayed beside each of the restrictions in the embodiment of FIG. 5B, the various embodiments are not so limited, and selection/de-selection may be made using any one of checkboxes, radial buttons, virtual buttons, virtual switches, highlighted text, highlighted icons, and/or the like.

Similarly, selecting or highlighting the user device N 525n might display a pop-up window or panel that allows the user to select one of the access restrictions against this device, including, but not limited to, one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, and/or the like. In the non-limited embodiment of FIG. 5B, full management access is selected. Any of the other devices might be selected in this manner, and access rights or restrictions for each of these devices might be selected by the user in a similar manner.

The first IoT-capable 515, the second IoT-capable devices 520a-520n, the user devices 525a-525n, the LAN 530, the third IoT-capable devices 540a-540n, and the network(s) 545, of FIGS. 5A and 5B are otherwise similar, if not identical, to the first IoT-capable 105 or 305, the second IoT-capable devices 120a-120n or 320a-320n, the user devices 125a-125n or 325a-325n, the network(s) 315, the third IoT-capable devices 160a-160n or 340a-340n (and also 345a-345n or 350a-350n, or the like), and the network(s) 150 or 335a (and also 335b or 335c, or the like), respectively, of systems 100-300' of FIGS. 1, 2, 3A, and 3B, and the descriptions of these components of FIGS. 5A and 5B are applicable to the corresponding components of system 100-300'.

Exemplary System and Hardware Implementation

Figure 6:
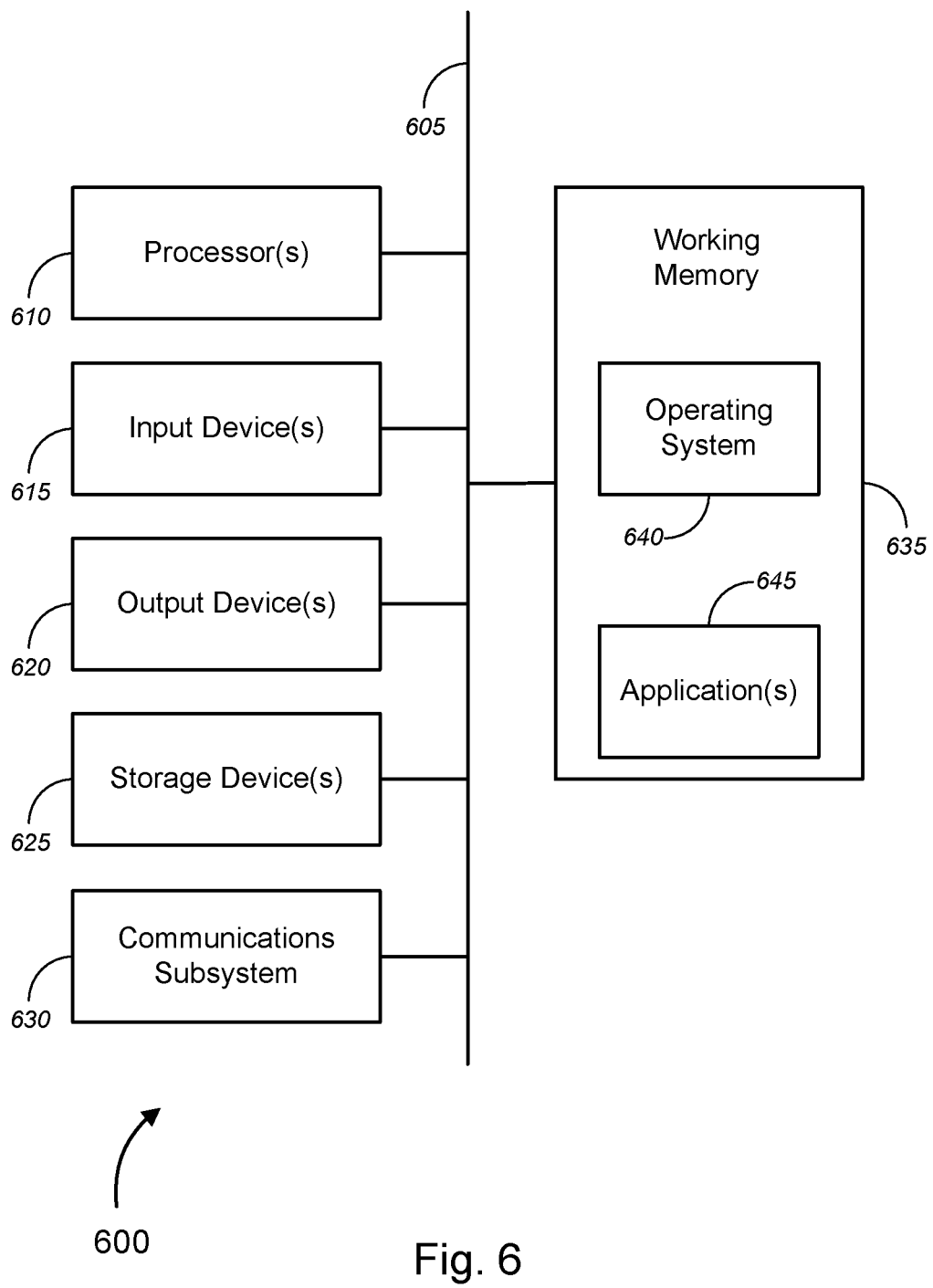
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., First Internet of Things ("IoT") devices 105, 305, 305', and 515, Built-In IoT-capable sensors 115a-115n, 235-280, and 310a-310n, Second IoT-capable devices 120a-120n, 320a-320n, and 520a-520n, user devices 125a-125n, 325a-325n, 500, and 525a-525n, computing system 130a and 130b, gateway 130c and 360, analytics engine 165, Third IoT-capable devices 160a-160n, 340a-340n, and 540a-540n, Fourth IoT-capable devices 345a-345n, and Fifth IoT-capable devices 350a-350n, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., First IoT devices 105, 305, 305', and 515, Built-In IoT-capable sensors 115a-115n, 235-280, and 310a-310n, Second IoT-capable devices 120a-120n, 320a-320n, and 520a-520n, user devices 125a-125n, 325a-325n, 500, and 525a-525n, computing system 130a and 130b, gateway 130c and 360, analytics engine 165, Third IoT-capable devices 160a-160n, 340a-340n, and 540a-540n, Fourth IoT-capable devices 345a-345n, and Fifth IoT-capable devices 350a-350n, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
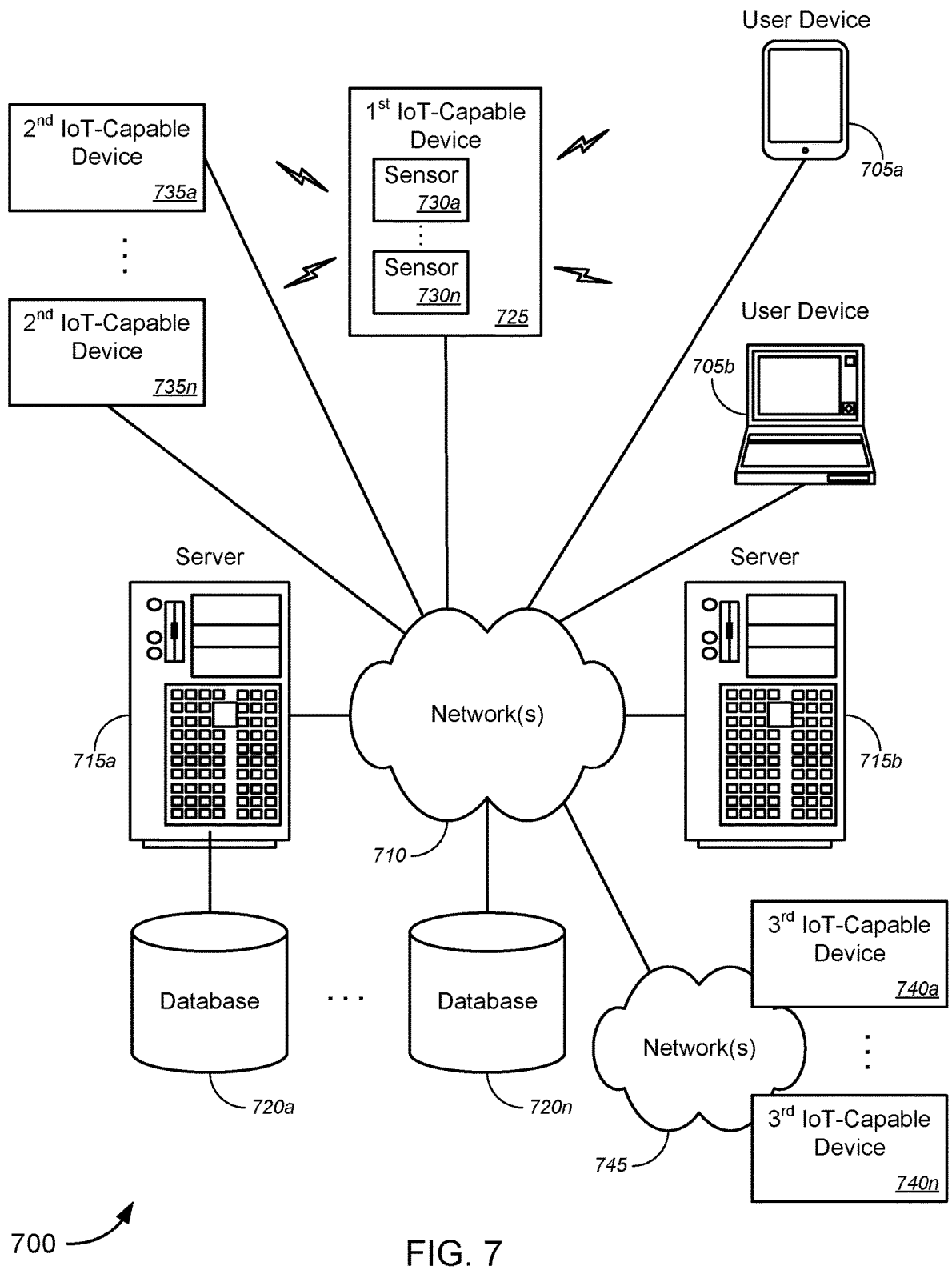
FIG. 7 is a block diagram illustrating an example of a networked system of computers, computing systems, or system hardware architecture, which can be used in accordance with various embodiments.

As noted above, a set of embodiments comprises methods and systems for implementing Internet of Things functionality, and, in particular embodiments, to methods, systems, apparatus, and computer software for implementing Internet of Things ("IoT") functionality for shared devices with public and private instances. FIG. 7 illustrates a schematic diagram of a system 700 that can be used in accordance with various embodiments. The system 700 can each include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 710 (similar to networks 135, 150, 315, 330, 335a-335c, 530, and 545 of FIGS. 1-3 and 5, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing Internet of Things functionality, and, in particular embodiments, to methods, systems, apparatus, and computer software for implementing Internet of Things ("IoT") functionality for shared devices with public and private instances, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a and 720b (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

With reference to FIG. 7, according to some embodiments, system 700 might further comprise a first IoT-capable device 725 (similar to first IoT-capable device 105, 305, 305', and 515 of FIGS. 1-3 and 5, or the like), one or more sensors 730a-730n (similar to Built-In IoT-capable sensors 115a-115n, 235-280, and 310a-310n of FIGS. 1-3, or the like), one or more second IoT-capable devices 735a-735n (similar to second IoT-capable devices 120a-120n, 320a-320n, and 520a-520n of FIGS. 1-3 and 5, or the like), one or more third IoT-capable devices 740a-740n (similar to third IoT-capable devices 160a-160n, 340a-340n, and 540a-540n of FIGS. 1-3 and 5, fourth IoT-capable devices 345a-345n of FIG. 3, or fifth IoT-capable devices 350a-350n of FIG. 3, or the like), and network(s) 745 that is associated with a third party who is associated with the one or more third IoT-capable devices 740a-740n.

In operation, the first IoT-capable device 725 might receive at least one sensor data from each of at least one sensor of the one or more IoT-capable sensors 730a-730n. The first IoT-capable device 725 might analyze the at least one sensor data to determine whether to send the at least one sensor data to at least one of second IoT-capable devices 735a-735n that are associated with a user or user devices 705a or 705b that are associated with the user. Based on a determination to send the at least one sensor data to at least one of one or more second IoT-capable devices 735a-735n that are associated with the user or one or more user devices 705a or 705b that are associated with the user, the first IoT-capable device 725 might autonomously send, via machine-to-machine communication, the at least one sensor data to the at least one of the one or more second IoT-capable devices 735a-735n that are associated with the user or one or more user devices 705a or 705b that are associated with the user. In some cases, the first IoT-capable device 725 might analyze the at least one sensor data to determine whether to send the at least one sensor data to at least one of third devices 740a-740n associated with third party groups with which the user has shared at least some access to the first IoT-capable device 725. Based on a determination to send the at least one sensor data to at least one of one or more third devices associated with each of the one or more third party groups, the first IoT-capable device 725 might autonomously send, via machine-to-machine communication, the at least one sensor data to the at least one third device 740 of the one or more third devices 740a-740n associated with each of the one or more third party groups. The machine-to-machine communications between the first IoT-capable device 725 and each of the user devices 705a or 705b or each of the second IoT-capable devices 735a-735n are represented in FIG. 7 by the lightning bolt symbols, which in some cases denotes wireless communications (although, in some instances, need not be wireless, but can be wired communications). Machine-to-machine communications is also shown by the solid lines (e.g., the solid lines connecting the first IoT-capable device 725 with network(s) 710 (and the third devices 740a-740n via network(s) 745)). These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a processor, at least one first sensor data from each of one or more first sensors of a first Internet of Things ("IoT")-capable device associated with a user, wherein the first IoT-capable device has a first configuration associated with the user, wherein the user is an owner of the first IoT-capable device;

analyzing, with the processor, the at least one first sensor data;

based on analyzed at least one first sensor data, determining whether to send the at least one first sensor data to at least one of second IoT-capable devices associated with the user or user devices associated with the user, wherein the at least one of second IoT-capable devices associated with the user or the user devices associated with the user utilize the first configuration associated with the user;

based on a determination to send the at least one first sensor data to at least one of one or more second IoT-capable devices associated with the user or one or more user devices associated with the user, sending, via machine-to-machine communication, the at least one first sensor data to the at least one of the one or more second IoT-capable devices associated with the user or the one or more user devices associated with the user;

receiving, with the processor, a sensor polling request for the at least one first sensor data from at least one third device of one or more third devices external to a customer premises of the user and associated with third party groups different from the user, wherein, prior to receiving the sensor polling request from the at least one third device, the at least one third device sends a second configuration that causes the processor to change the first configuration associated with the user of the first IoT-capable device to the second configuration of the first IoT-capable device, wherein the first IoT-capable device maintains the second configuration during polling of the at least one first sensor data by the at least one third device, wherein the second configuration of the first IoT-capable device is a known configuration associated with the at least one third device external to the customer premises of the user and associated with the third party groups different from the user, and wherein, the processor restores the first configuration associated with the user of the first IoT-capable device when polling of the at least one first sensor data by the at least one third device is completed;

in response to the sensor polling request from the at least one third device of the one or more third devices and based on the analyzed at least one first sensor data, determining whether to send the at least one first sensor data to the at least one third device of the one or more third devices external to the customer premises of the user and associated with the third party groups different from the user with which the user has shared at least some access to the first IoT-capable device; and in response to the sensor polling request from the at least one third device of the one or more third devices and based on a determination to send the at least one first sensor data to the at least one third device of the one or more third devices external to the customer premises of the user and associated with each of the one or more third party groups different from the user, sending, via machine-to-machine communication, the at least one first sensor data to the at least one third device of the one or more third devices external to the customer premises of the user and associated with each of the one or more third party groups different from the user.

2. The method of claim 1, wherein the one or more first sensors comprise at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor.

3. The method of claim 1, wherein the processor is one of a processor of a customer premises gateway device, a processor of a network gateway device, a processor of an IoT gateway device, or a processor of an IoT human interface device, wherein sending the at least one first sensor data comprises autonomously sending, by the processor of the one of the processor of the customer premises gateway device, the processor of the network gateway device, the processor of the IoT gateway device, or the processor of the IoT human interface device and via machine-to-machine communication, the at least one first sensor data to one or more of the at least one third device of the one or more third devices associated with each of the one or more third party groups or the at least one of the one or more second IoT-capable devices associated with the user or the one or more user devices associated with the user, via a corresponding one of the customer premises gateway device, the network gateway device, the IoT gateway device, or the IoT human interface device.

4. The method of claim 1, wherein the processor is one of a processor of the first IoT-capable device, a processor of a customer premises gateway device, a processor of a network gateway device, a processor of an IoT gateway device, or a processor of an IoT human interface device, wherein analyzing the at least one first sensor data to determine whether to send the at least one first sensor data to at least one of second IoT-capable devices associated with the user or user devices associated with the user comprises analyzing, with the processor, the at least one first sensor data to determine whether to send the at least one first sensor data to at least one of second IoT-capable devices associated with the user or user devices associated with the user based at least in part on a determination as to whether the at least one first sensor data satisfies one or more first conditions, the one or more first conditions comprising at least one of exceeding a first predetermined threshold value for a sensor-type of the one or more first sensors or falling within a first monitoring interval.

5. The method of claim 4, wherein analyzing the at least one first sensor data to determine whether to send the at least one first sensor data to at least one of third devices associated with third party groups comprises analyzing, with the processor, the at least one first sensor data to determine whether to send the at least one first sensor data to at least one of third devices associated with third party groups based at least in part on a determination as to whether the at least one first sensor data satisfies one or more second conditions, the one or more second conditions comprising at least one of exceeding a second predetermined threshold value for a sensor-type of the one or more first sensors or falling within a second monitoring interval, wherein at least one of the one or more second conditions is different from at least one of the one or more first conditions.

6. The method of claim 1, wherein the processor is one of a processor of a customer premises gateway device, a processor of a network gateway device, a processor of an IoT gateway device, or a processor of an IoT human interface device, wherein sending the at least one first sensor data to the at least one of the one or more second IoT-capable devices associated with the user or the one or more user devices associated with the user comprises sending, by the first IoT-capable device, the at least one first sensor data to the at least one of the one or more second IoT-capable devices associated with the user or the one or more user devices associated with the user, in response to command instructions from the one of the processor of the customer premises gateway device, the processor of the network gateway device, the processor of the IoT gateway device, or the processor of the IoT human interface device to send the at least one first sensor data to the at least one of the one or more second IoT-capable devices or the one or more user devices, wherein sending the at least one first sensor data to the at least one third device of the one or more third devices associated with each of the one or more third party groups comprises sending, by the first IoT-capable device, the at least one first sensor data to the at least one third device of the one or more third devices associated with each of the one or more third party groups, in response to command instructions from the one of the processor of the customer premises gateway device, the processor of the network gateway device, the processor of the IoT gateway device, or the processor of the IoT human interface device to send the at least one first sensor data to the at least one third device.

7. The method of claim 1, wherein sending the at least one first sensor data to the at least one of the one or more second IoT-capable devices associated with the user or the one or more user devices associated with the user comprises autonomously sending, by the first IoT-capable device, the at least one first sensor data to the at least one of the one or more second IoT-capable devices associated with the user or the one or more user devices associated with the user, wherein sending the at least one first sensor data to the at least one third device of the one or more third devices associated with each of the one or more third party groups comprises autonomously sending, by the first IoT-capable device, the at least one first sensor data to the at least one third device of the one or more third devices associated with each of the one or more third party groups.

8. The method of claim 1, wherein sending the at least one first sensor data to the at least one of the one or more second IoT-capable devices associated with the user or the one or more user devices associated with the user, based on determination to send the at least one first sensor data to at least one of one or more second IoT-capable devices associated with the user or one or more user devices associated with the user, comprises sending, by the first IoT-capable device, the at least one first sensor data to the at least one of the one or more second IoT-capable devices associated with the user or the one or more user devices associated with the user, in response to a sensor polling request from the at least one of the one or more second IoT-capable devices associated with the user or the one or more user devices associated with the user.

9. The method of claim 1, wherein sending the at least one first sensor data to the at least one of the one or more second IoT-capable devices associated with the user or the one or more user devices associated with the user comprises sending the at least one first sensor data to the at least one of the one or more second IoT-capable devices associated with the user or the one or more user devices associated with the user via one or more first application programming interfaces ("APIs") established between the first IoT-capable device and each of the at least one of the one or more second IoT-capable devices associated with the user or the one or more user devices associated with the user.

10. The method of claim 1, wherein sending the at least one first sensor data to the at least one of the one or more second IoT-capable devices associated with the user or the one or more user devices associated with the user comprises sending the at least one first sensor data to the at least one of the one or more second IoT-capable devices associated with the user or the one or more user devices associated with the user via one or more first virtual private network ("VPN") connections established between the first IoT-capable device and each of the at least one of the one or more second IoT-capable devices associated with the user or the one or more user devices associated with the user.

11. The method of claim 1, wherein sending the at least one first sensor data to the at least one third device of the one or more third devices associated with each of the one or more third party groups comprises sending the at least one first sensor data to the at least one third device of the one or more third devices associated with each of the one or more third party groups via one or more second APIs established between the first IoT-capable device and each of the at least one third device of the one or more third devices associated with each of the one or more third party groups.

12. The method of claim 1, wherein sending the at least one first sensor data to the at least one third device of the one or more third devices associated with each of the one or more third party groups comprises sending the at least one first sensor data to the at least one third device of the one or more third devices associated with each of the one or more third party groups via one or more second VPN connections established between the first IoT-capable device and each of the at least one third device of the one or more third devices associated with each of the one or more third party groups.

13. The method of claim 1, wherein access to sensor data from each of one or more first sensors of the first IoT-capable device by one or more of the at least one of the one or more second IoT-capable devices associated with the user or the one or more user devices associated with the user or the at least one third device of the one or more third devices associated with each of the one or more third party groups is defined by the user using a portal, wherein the portal comprises one of a web portal associated with a service provider, a web portal associated with the first IoT-capable device, a web portal associated with at least one of the one or more third party groups, a software application ("app") user interface ("UI") associated with a service provider, a software app UI associated with the first IoT-capable device, or a software app UI associated with at least one of the one or more third party groups through which the user registers the IoT-capable device for access by the one or more of the at least one third device of the one or more third devices associated with each of the one or more third party groups or the at least one of the one or more second IoT-capable devices associated with the user or the one or more user devices associated with the user.

14. The method of claim 1, wherein the first configuration of the first IoT-capable device is changed to accommodate a third configuration of an accessing device during access of the at least one first sensor data by the accessing device, the accessing device being one of the one or more second IoT-capable devices associated with the user, the one or more user devices associated with the user, or the at least one third device of the one or more third devices associated with each of the one or more third party groups.

15. The method of claim 14, wherein the accessing device changes the first configuration of the first IoT-capable device to accommodate its third configuration, during access of the at least one first sensor data, and restores the first configuration of the first IoT-capable device, after access of the at least one first sensor data.

16. The method of claim 14, wherein, after access of the at least one first sensor data by the accessing device, which changes the first configuration of the first IoT-capable device to accommodate its third configuration, the first IoT-capable device restores its current third configuration to its first configuration, either after a predetermined interval after the accessing device has stopped access or in response to a restoration instruction from the accessing device.

17. The method of claim 1, wherein analyzing the at least one first sensor data to determine whether to send the at least one first sensor data to at least one of third devices associated with third party groups with which the user has shared at least some access to the first IoT-capable device comprises analyzing, with the processor, the at least one first sensor data to determine whether to send the at least one first sensor data to at least one of third devices associated with third party groups with which the user has shared at least some access to the first IoT-capable device based on access restrictions placed by the user on each of the third party groups associated with the at least one third device, the access restrictions comprising one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, wherein sending the at least one first sensor data to the at least one third device of the one or more third devices associated with each of the one or more third party groups comprises sending, via machine-to-machine communication, the at least one first sensor data to the at least one third device of the one or more third devices associated with each of the one or more third party groups, by giving the at least one third device one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, consistent with the access restrictions placed by the user on each of the third party groups associated with the at least one third device.

18. The method of claim 1, wherein availability of resources of the first IoT-capable device is posted on a publically accessible portal, wherein the portal tracks subscribers to the first IoT-capable device and provides the user with information regarding the subscribers to the first IoT-capable device, wherein the portal manages subscriber registration and access to the first IoT-capable device.

19. The method of claim 1, wherein the first IoT-capable device is one of a plurality of IoT-capable devices, and each IoT-capable device is assigned a unique identifier, wherein the unique identifier is at least one of Internet Protocol ("IP")-based, location based, or media access control identification ("MAC ID") based.

20. The method of claim 19, wherein the unique identifier is one of a unique IPv4 identifier or a unique IPv6 identifier.

21. A shared Internet of Things ("IoT")-capable device, comprising:
at least one processor;
one or more first sensors;
at least one transceiver; and
a non-transitory computer readable medium communicatively coupled to the at least one processor, the non-transitory computer readable medium having stored thereon computer software comprising a set of instructions that, when executed by the at least one processor, causes the shared IoT-capable device to:
receive at least one first sensor data from each of the one or more first sensors;
analyze the at least one first sensor data;
based on analyzed at least one first sensor data, determine whether to send the at least one first sensor data to at least one of second IoT-capable devices associated with a user or user devices associated with the user, wherein the first IoT-capable device has a first configuration associated with the user, wherein the user is an owner of the first IoT-capable device, and wherein the at least one of second IoT-capable devices associated with the user or the user devices associated with the user utilize the first configuration associated with the user;
based on a determination to send the at least one first sensor data to at least one of one or more second IoT-capable devices associated with the user or one or more user devices associated with the user, sending, via machine-to-machine communication using the at least one transceiver, the at least one first sensor data to the at least one of the one or more second IoT-capable devices associated with the user or the one or more user devices associated with the user;
receive a sensor polling request for the at least one first sensor data from at least one third device of one or more third devices external to a customer premises of the user and associated with third party groups different from the user, wherein, prior to receiving the sensor polling request from the at least one third device, the at least one third device sends a second configuration that causes the processor to change the first configuration associated with the user of the first IoT-capable device to the second configuration of the first IoT-capable device, wherein the first IoT-capable device maintains the second configuration during polling of the at least one first sensor data by the at least one third device, wherein the second configuration of the first IoT-capable device is a known configuration associated with the at least one third device external to the customer premises of the user and associated with the third party groups different from the user, and wherein, the processor restores the first configuration associated with the user of the first IoT-capable device when polling of the at least one first sensor data by the at least one third device is completed;
in response to the sensor polling request from the at least one third device of the one or more third devices and based on the analyzed at least one first sensor data, determine whether to send the at least one first sensor data to the at least one third device of the one or more third devices external to the customer premises of the user and associated with the third party groups different from the user with which the user has shared at least some access to the first IoT-capable device; and in response to the sensor polling request from the at least one third device of the one or more third devices and based on a determination to send the at least one first sensor data to the at least one third device of the one or more third devices external to the customer premises of the user and associated with each of the one or more third party groups different from the user, send, via machine-to-machine communication using the at least one transceiver, the at least one first sensor data to the at least one third device of the one or more third devices external to the customer premises of the user and associated with each of the one or more third party groups different from the user.

22. The shared IoT-capable device of claim 21, wherein the one or more first sensors comprise at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor.

23. The shared IoT-capable device of claim 21, wherein the shared IoT-capable device comprises at least one of one or more wireless access points, one or more sensor devices, one or more cameras, a gateway device, or an IoT human interface device.

24. The shared IoT-capable device of claim 21, wherein sending the at least one first sensor data comprises sending, via machine-to-machine communication, the at least one first sensor data to one or more of the at least one third device of the one or more third devices associated with each of the one or more third party groups or the at least one of the one or more second IoT-capable devices associated with the user or the one or more user devices associated with the user, via at least one of a customer premises gateway device, a network gateway device, an IoT gateway device, or an IoT human interface device.

25. The shared IoT-capable device of claim 21, wherein the first configuration of the first IoT-capable device is changed to accommodate a third configuration of an accessing device during access of the at least one first sensor data by the accessing device, the accessing device being one of the one or more second IoT-capable devices associated with the user, the one or more user devices associated with the user, or the at least one third device of the one or more third devices associated with each of the one or more third party groups.

26. The shared IoT-capable device of claim 25, wherein the accessing device changes the first configuration of the first IoT-capable device to accommodate its third configuration, during access of the at least one first sensor data, and restores the first configuration of the first IoT-capable device, after access of the at least one first sensor data.

27. The shared IoT-capable device of claim 25, wherein, after access of the at least one first sensor data by the accessing device, which changes the first configuration of the first IoT-capable device to accommodate its third configuration, the first IoT-capable device restores its current third configuration to its first configuration, either after a predetermined interval after the accessing device has stopped access or in response to a restoration instruction from the accessing device.

28. The shared IoT-capable device of claim 21, wherein analyzing the at least one first sensor data to determine whether to send the at least one first sensor data to at least one of third devices associated with third party groups with which the user has shared at least some access to the first IoT-capable device comprises analyzing the at least one first sensor data to determine whether to send the at least one first sensor data to at least one of third devices associated with third party groups with which the user has shared at least some access to the first IoT-capable device based on access restrictions placed by the user on each of the third party groups associated with the at least one third device, the access restrictions comprising one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, wherein sending the at least one first sensor data to the at least one third device of the one or more third devices associated with each of the one or more third party groups comprises sending, via machine-to-machine communication, the at least one first sensor data to the at least one third device of the one or more third devices associated with each of the one or more third party groups, by giving the at least one third device one of data-limited access to sensor data from the one or more first sensors, time-limited access to sensor data from the one or more first sensors, location-limited access to sensor data from the one or more first sensors, full access to sensor data from the one or more first sensors, full access to sensor data from the one or more first sensors and to one or more other functionalities of the first IoT-capable device, limited management access to the first IoT-capable device, or full management access to the first IoT-capable device, consistent with the access restrictions placed by the user on each of the third party groups associated with the at least one third device.

29. The shared IoT-capable device of claim 21, wherein the first IoT-capable device is one of a plurality of IoT-capable devices, and each IoT-capable device is assigned a unique identifier, wherein the unique identifier is at least one of Internet Protocol ("IP") based, location based, or media access control identification ("MAC ID")-based.

30. A system, comprising:
a first Internet of Things ("IoT")-capable device, wherein the first IoT-capable device has a first configuration associated with a user, wherein the user is an owner of the first IoT-capable device, the first IoT capable device comprising:
at least one first processor;
one or more first sensors;
at least one first transceiver; and
a first non-transitory computer readable medium communicatively coupled to the at least one first processor, the first non-transitory computer readable medium having stored thereon computer software comprising a first set of instructions that, when executed by the at least one first processor, causes the first IoT-capable device to:

receive at least one first sensor data from each of the one or more first sensors; and send the at least one first sensor data to a computing system via the at least one first transceiver;

the computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the computing system to:

receive the at least one first sensor data from each of one or more first sensors of the first IoT-capable device;

analyze the at least one first sensor data;

based on analyzed at least one first sensor data, determine whether to send the at least one first sensor data to at least one of second IoT-capable devices associated with a user or user devices associated with the user, wherein the at least one of second IoT-capable devices associated with the user or the user devices associated with the user utilize the first configuration associated with the user;

based on a determination to send the at least one first sensor data to at least one of one or more second IoT-capable devices associated with the user or one or more user devices associated with the user, sending, via machine-to-machine communication using the at least one transceiver, the at least one first sensor data to the at least one of the one or more second IoT-capable devices associated with the user or the one or more user devices associated with the user;

receiving a sensor polling request for the at least one first sensor data from at least one third device of one or more third devices external to a customer premises of the user and associated with third party groups different from the user, wherein, prior to receiving the sensor polling request from the at least one third device, the at least one third device sends a second configuration that causes the processor to change the first configuration associated with the user of the first IoT-capable device to a second configuration of the first IoT-capable device, wherein the first IoT-capable device maintains the second configuration during polling of the at least one first sensor data by the at least one third device, wherein the second configuration of the first IoT-capable device is a known configuration associated with the at least one third device external to the customer premises of the user and associated with the third party groups different from the user, and wherein, the processor restores the first configuration associated with the user of the first IoT-capable device when polling of the at least one first sensor data by the at least one third device is completed;

in response to the sensor polling request from the at least one third device of the one or more third devices and based on the analyzed at least one first sensor data, determine whether to send the at least one first sensor data to the at least one third device of the one or more third devices external to the customer premises of the user and associated with the third party groups different from the user with which the user has shared at least some access to the first IoT-capable device; and in response to the sensor polling request from the at least one third device of the one or more third devices and based on a determination to send the at least one first sensor data to at least one of one or more third devices external to the customer premises of the user and associated with each of the one or more third party groups different from the user, send, via machine-to-machine communication using the at least one transceiver, the at least one first sensor data to the at least one third device of the one or more third devices external to the customer premises of the user and associated with each of the one or more third party groups different from the user.

31. The system of claim 30, wherein the computing system comprises one of one or more processors disposed within one of the one or more second IoT-capable devices associated with the user, one or more processors disposed within one of the one or more user devices associated with the user, one or more processors disposed within one of the at least one third device of the one or more third devices associated with each of the one or more third party groups, a customer premises gateway device, a network gateway device, an IoT gateway device, or an IoT human interface device.

32. The system of claim 30, wherein the computing system is disposed within the first IoT-capable device, and wherein sending the at least one first sensor data to a computing system via the at least one first transceiver and receiving the at least one first sensor data from each of one or more first sensors of the first IoT-capable device comprise sending and receiving the at least one first sensor data between the one or more first sensors and the computing system via an internal communications system of the first IoT-capable device.

33. The system of claim 30, wherein the one or more first sensors comprise at least one of a temperature sensor, a particulate sensor, a light sensor, an air quality sensor, a humidity sensor, a proximity sensor, a location sensor, a location beacon, an object identifier beacon, a flame detector, an atmospheric oxygen level monitor, an atmospheric carbon dioxide level monitor, an atmospheric nitrogen level monitor, an atmospheric pressure sensor, an environmental carbon monoxide sensor, a smoke detector, a toxicity monitor, a carcinogen detector, a radiation sensor, a telecommunications signal sensor, a sound amplitude sensor, a frequency sensor, an accelerometer, a moisture sensor, a motion sensor, a wind sensor, a weather sensor, or a seismic sensor.

34. The system of claim 30, wherein the first IoT-capable device is one of a plurality of IoT-capable devices, and each IoT-capable device is assigned a unique identifier, wherein the unique identifier is at least one of Internet Protocol ("IP")-based, location based, or media access control identification ("MAC ID")-based.

* * * * *